US008409000B1

(12) United States Patent
Colaco et al.

(10) Patent No.: US 8,409,000 B1
(45) Date of Patent: Apr. 2, 2013

(54) CONFIGURING ADVERTISEMENTS IN A VIDEO SEGMENT BASED ON A GAME RESULT

(75) Inventors: Jean-Paul Colaco, Manhattan Beach, CA (US); Jessica P. Ivy, Venice, CA (US); Arash Nikkar, La Crescenta, CA (US); Thomas C. Tate, Venice, CA (US)

(73) Assignee: Hulu LLC, Los Angeles, CA (US)

( * ) Notice: Subject to any disclaimer, the term of this patent is extended or adjusted under 35 U.S.C. 154(b) by 0 days.

(21) Appl. No.: 13/417,151

(22) Filed: Mar. 9, 2012

(51) Int. Cl.
*A63F 13/00* (2006.01)
*A63F 9/24* (2006.01)

(52) U.S. Cl. .......................................... 463/31; 463/42

(58) Field of Classification Search ............... 463/16–42
See application file for complete search history.

(56) References Cited

U.S. PATENT DOCUMENTS

| 6,659,873 | B1 * | 12/2003 | Kitano et al. ................... 463/42 |
| 8,109,831 | B2 * | 2/2012 | Kataoka et al. ................. 463/42 |
| 8,128,493 | B2 * | 3/2012 | Willis et al. ..................... 463/31 |
| 2006/0135233 | A1 * | 6/2006 | Willis et al. ........................ 463/1 |
| 2006/0166742 | A1 * | 7/2006 | Willis et al. ..................... 463/42 |
| 2008/0102947 | A1 * | 5/2008 | Hays et al. ...................... 463/31 |
| 2012/0232988 | A1 * | 9/2012 | Yang et al. ................. 705/14.49 |

* cited by examiner

*Primary Examiner* — Masud Ahmed
(74) *Attorney, Agent, or Firm* — Novak Druce Connolly Bove + Quigg LLP; Jonathan Jaech

(57) ABSTRACT

Configuration of advertisements in a streaming video segment from a serving node is based on a result of an interactive game process executing on a client device. A configuration of advertisements in the streaming video is determined based on the game result. The configuration may include which advertisements are selected to play during ad slots to be included in the video segment, or a number of ad slots to be provided in the video segment. The serving node may configure the video segment with the advertisements selected based on the game result in the determined number of ad slots so that the selected advertisements are played during the ad slots when the video segment is streamed to the client device. If the video segment is configured with no ad slots based on the game result, then the video segment may be streamed to the client device without advertisements.

50 Claims, 16 Drawing Sheets

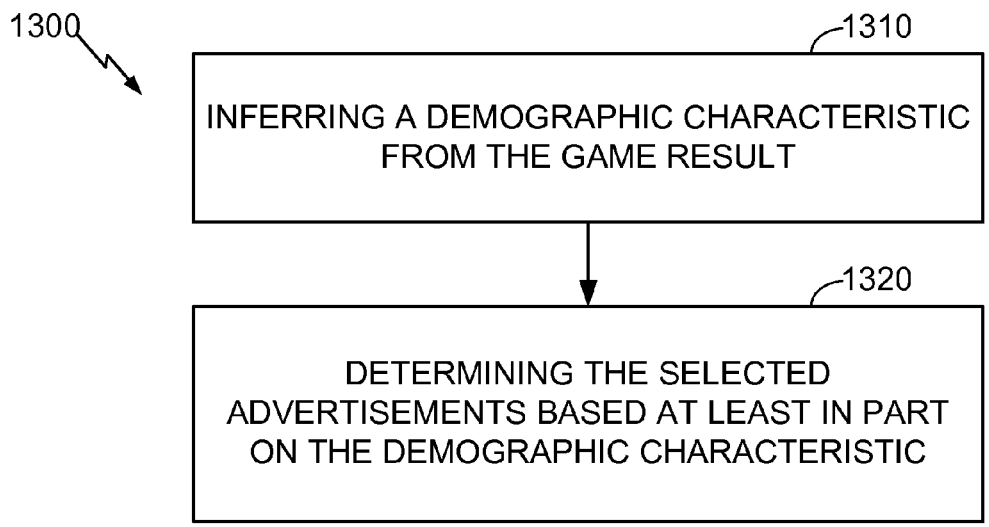
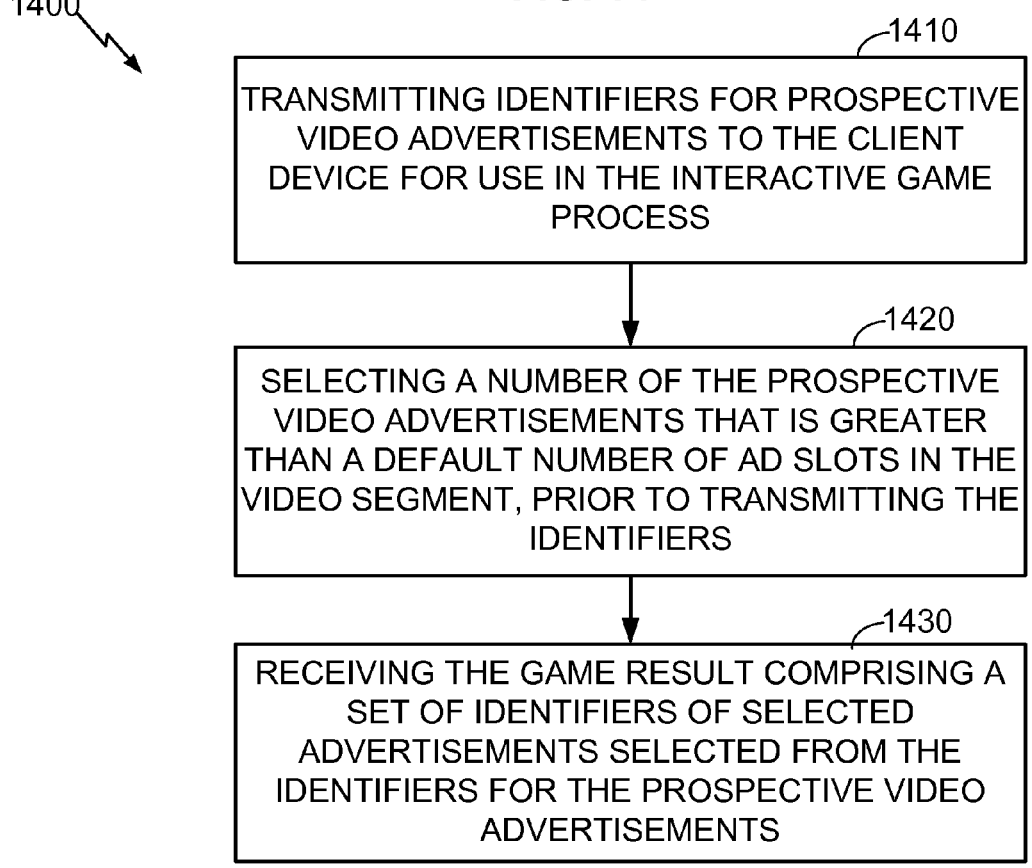

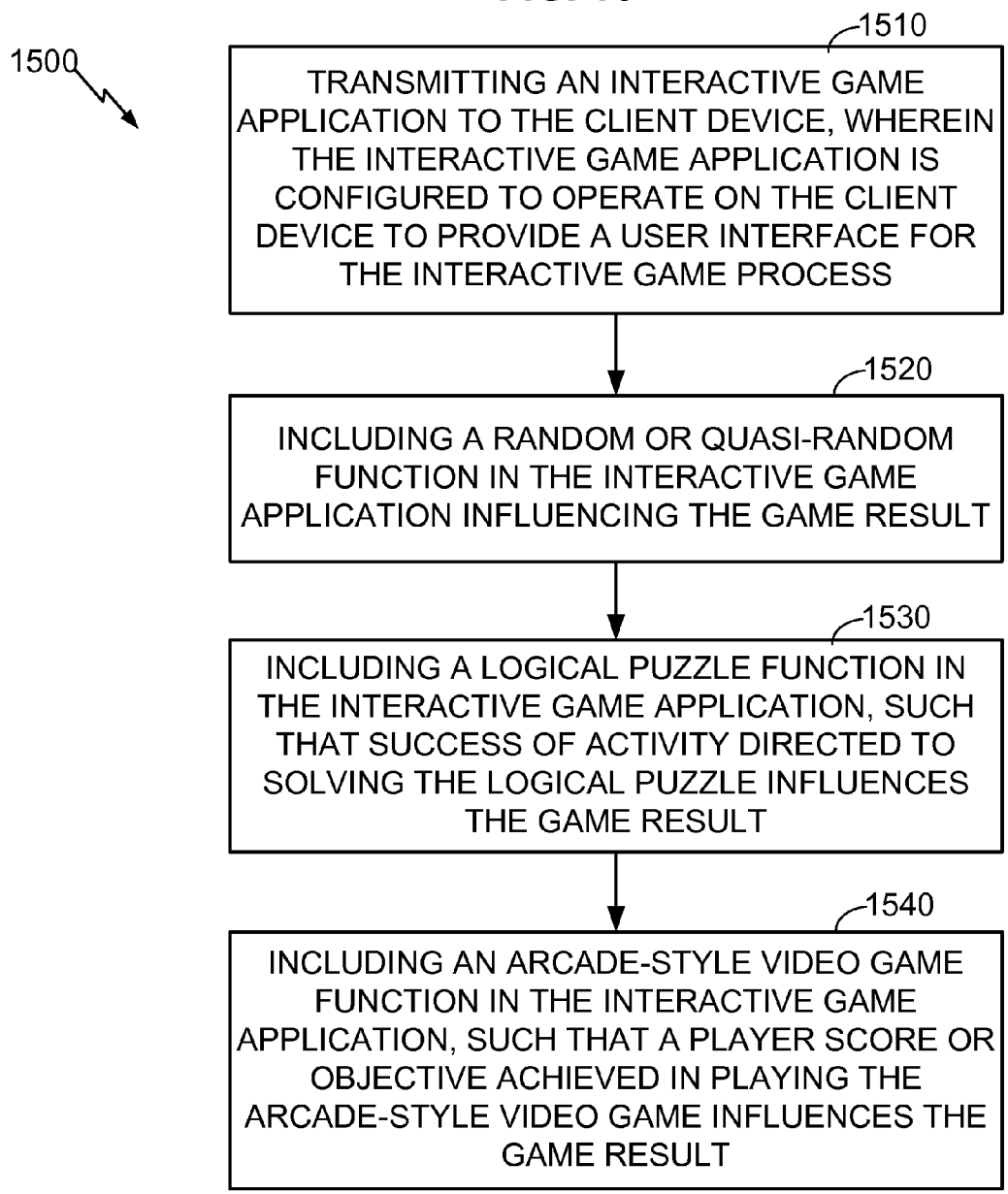

US 8,409,000 B1

CONFIGURING ADVERTISEMENTS IN A VIDEO SEGMENT BASED ON A GAME RESULT

FIELD

The present application relates generally to input/output processing using a computer, and more particularly to enabling configuration of advertisements in a video segment, for example a streaming video segment, based on a result of a computer game.

BACKGROUND

Advertising-supported distribution of audio-video data may be implemented from a content server to remote client devices over computer networks, telecommunications networks, and combinations of such networks, using various methods, for example progressive downloading or streaming.

In streaming, a server streams audio-video data continuously to a media player component operating at least partly on the client device, which may play the audio-video data concurrently with receiving the streaming data from the server. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Unlike progressive downloading, streaming media can be delivered on-demand or live. Progressive download requires downloading the entire file or downloading enough of the entire file to start playback at the beginning, whereas streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Unlike the web server, the streaming media server communicates with the client device using control messages and data messages to adjust to changing network conditions as the video is played. These control messages can include commands for enabling control functions such as fast forward, fast reverse, pausing, or seeking to a particular part of the file at the client. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the user device at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Streaming media players do not rely on buffering to provide random access to any point in the media program. Instead, this is accomplished through the use of control messages transmitted from the media player to the streaming media server.

The delivery of video content by streaming or progressive download may be accomplished under a variety of models. In one model, the user pays for the viewing of each video program, for example, using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots. While this feature is helpful for ensuring that ad impressions are delivered to the client device, a lack of ability for the user to influence or control the number of ad slots or advertising content played during the ad slots may reduce the interest of some viewers in viewing streaming video content with inserted advertising.

These and other limitations of prior method for controlling advertising inserted in streaming video or progressively downloaded video may be overcome by the novel methods and apparatus disclosed herein.

SUMMARY

Methods, apparatus and systems for enabling configuration of advertisements in a video segment based on a result of a computer game are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

A computer server in communication with one or more client devices may perform a method for configuring advertisements in a video segment based on a game result. The game may include a game of skill, chance, or mixed chance and skill, played using the client device, alone or in cooperation with a network node. By participating in the game, which may be presented as an optional feature, a user may influence a number or length of advertisements presented during a streaming video session or the type of advertisements presented.

The method may include receiving a game result from an interactive game process, prior to enabling play of a requested video segment on a client device. The method may further include determining, based on the game result, a video segment configuration including at least one of: (a) selected advertisements to play during ad slots to be included in the video segment or (b) a number of the ad slots. The method may further include configuring the video segment with the number of ad slots so that the selected advertisements are played during the ad slots when the video segment is streamed to the client device if the number of ad slots is greater than zero, and no advertisements are played when the video segment is streamed to the client device if the number of ad slots is zero.

In an aspect, the method may include transmitting identifiers for prospective video advertisements to the client device for use in the interactive game process. The method may include selecting a number of the prospective video advertisements that is greater than a default number of ad slots in the video segment, prior to transmitting the identifiers. In such case, the method may include receiving the game result comprising a set of identifiers of selected advertisements selected from the identifiers for the prospective video advertisements.

In another aspect, the method may include transmitting an interactive game application to the client device, wherein the interactive game application is configured to operate on the client device to provide a user interface for the interactive game process. The computer server may configure the interactive game application to operate various types of games. In an aspect, the method may include providing a random or quasi-random function in the interactive game application influencing the game result. In an alternative, or in addition, the method may include providing a logical puzzle function in the interactive game application, such that success of activity directed to solving the logical puzzle influences the game result. For further example, the method may include providing an arcade-style video game function in the interactive game application, such that a player score or objective achieved in playing the arcade-style video game influences the game result.

Styles of game play and skill levels in playing may be indicative of player demographics. The method may therefore include inferring a demographic characteristic from the game result, and determining the selected advertisements based at least in part on the demographic characteristic. In addition, or in an alternative, the method may include receiving a selection from the client device of the interactive game process selected from multiple optional interactive game processes. Similarly, the method may include inferring a demographic characteristic from the selection, and determining the selected advertisements based at least in part on the demographic characteristic.

The number of ad slots may be fixed prior to determining the selected advertisements based on the game result, and remain unaltered based on the game result. In this case, the game result may be used for determining the identity or type of advertisements selected to play during a video streaming session.

In another aspect, the number of ad slots may be changed based on the game result. In such embodiments, the method may include defining the number of ad slots based on the game result. For example, the method may include reducing the number of ad slots, based on the game result satisfying a defined condition. For further example, the method may include defining the condition based on the game result achieving a threshold score. Thus, for example, by achieving a high score, a user may avoid viewing some or all advertisements for a video streaming session.

Complementary operations, features, and aspects may also be implemented at a client device in communication with the computer server. Methods and apparatus for implementing the advertising control based on a game result at a client device are described in the detailed description below.

In related aspects, a client-side or server-side computing apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as computer servers, personal computers, network-enabled televisions, set-top boxes, smart phones, notepad or palm computers, laptop computers, and other computing devices of various types used for providing or accessing information over a computer network. Similarly, an article of manufacture may be provided, including a non-transitory computer-readable medium holding encoded instructions, which when executed by a processor, may cause a client-side or server-side computing apparatus to perform the methods and aspects of the methods as summarized above.

Further embodiments, aspects and details of methods, apparatus and systems for enabling configuration of advertisements in a video segment based on a result of a computer game are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology. Like element numerals may be used to indicate like elements appearing in one or more of the figures.

FIGS. 12-17 are diagrams illustrating operations that may be performed by a network node in connection with determining selection or configuration of advertising in a streaming video segment based on results of a computer game process.

DETAILED DESCRIPTION

Figure 1:
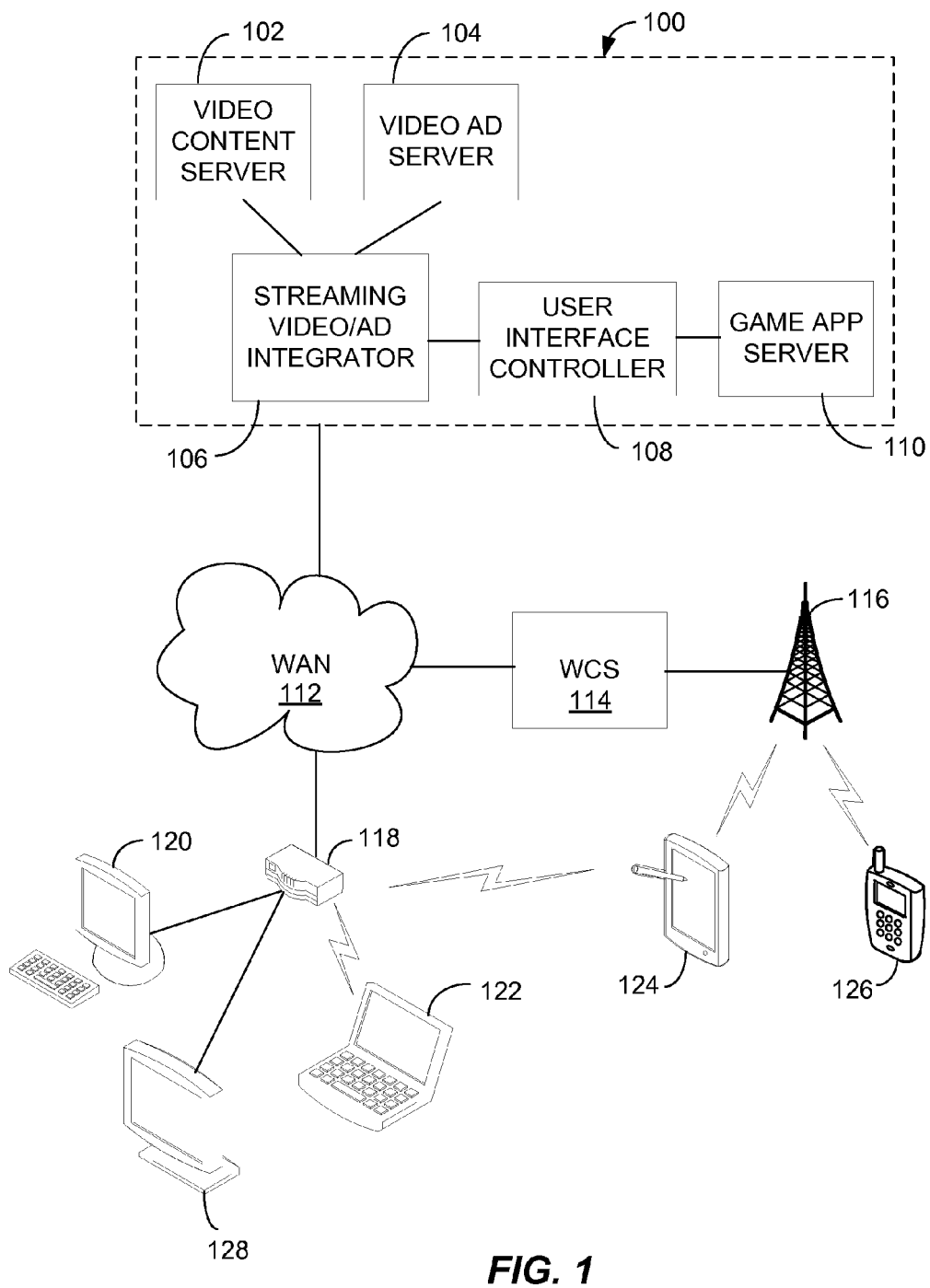
FIG. 1 is a schematic diagram illustrating an embodiment of a computing environment in which systems and methods discussed herein may be implemented.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Features and aspects as disclosed herein may be implemented within a system including a video streaming system 100 in communication with multiple client devices via one or more communication networks. The video streaming system 100 may include one or more computer servers or modules 102, 104, 106, 108 and/or 110 distributed over one or more computers. Each server 102, 104, 110 may include, or may be operatively coupled to, one or more data stores, for example databases, indexes, files, or other data structures. A video content server 102 may access a data store of various video segments; for example, television episodes, motion pictures, and other content produced as primary content of interest to consumers. The video content server 102 may serve the video segments as directed by a user interface controller module 108.

A video advertising server 104 may access a data store of relatively short video segments (e.g., 10 second, 30 second, or 60 second segments) configured as advertising for a particular advertiser or message. The advertising may be provided for an advertiser in exchange for payment of same kind, or may comprise a promotional message for the system 100, a public service message, or some other information. The ad server 104 may serve the video advertising segments as directed by the user interface controller 108.

A game application server 110 may access a data store of game applications, for example one or more compact distributable games of chance, skill, or mixed chance and skill adapted for use by the video streaming system 100. The game application server may server game applications as directed by the user interface controller 108. The video streaming system 100 may further include an integrator component 106 that integrates video content and video advertising into a streaming video segment as directed by the controller 108. The controller 108 may determine the selection or configuration of advertising in the streaming video based on the result of one or more games from the game application server 110 played on a target client device, alone or in cooperation with a network node. Optionally, the integrator 106 may integrate a game application into streaming content, if the game is configured to be playable by a media player receiving the streaming video from the integrator 106. The video streaming system 100 may include other modules or units not depicted in FIG. 1, for example administrative servers, commerce servers, network infrastructure, advertising selection engines, and so forth.

The video streaming system 100 may connect to a data communication network 112. A data communication network 112 may comprise a local area network (LAN), a wide area network (WAN), for example, the Internet, a telephone network, a wireless cellular telecommunications network 114, or some combination of these or similar networks.

One or more client devices may be in communication with the video streaming system 100, via the data communication network 116 and/or other network 114. Such client devices may include, for example, one or more laptop computers 122, desktop computers 120, "smart" mobile phones 126, notepad devices 124, network-enabled televisions 128, or combinations thereof, via a router 118 for a LAN, via a base station 116 for a wireless telephony network 114, or via some other connection. In operation, such client devices 120, 122, 124, 126, 128 may send and receive data or instructions to the system 100, in response to user input received from user input devices or other input. In response, the system 100 may serve video segments and game applications to the client devices 120, 122, 124, 126, 128 and configure video segments with advertising based on results of the game applications. The devices 120, 122, 124, 126, 128 may output video and game content from the streaming video segment and game application using a display screen, projector, or other video output device. In certain embodiments, the system 100 configured in accordance with the features and aspects disclosed herein may be configured to operate within or support a cloud computing environment. For example, a portion of, or all of, the servers 102, 104 or 110 may reside in a cloud server.

Figure 2:
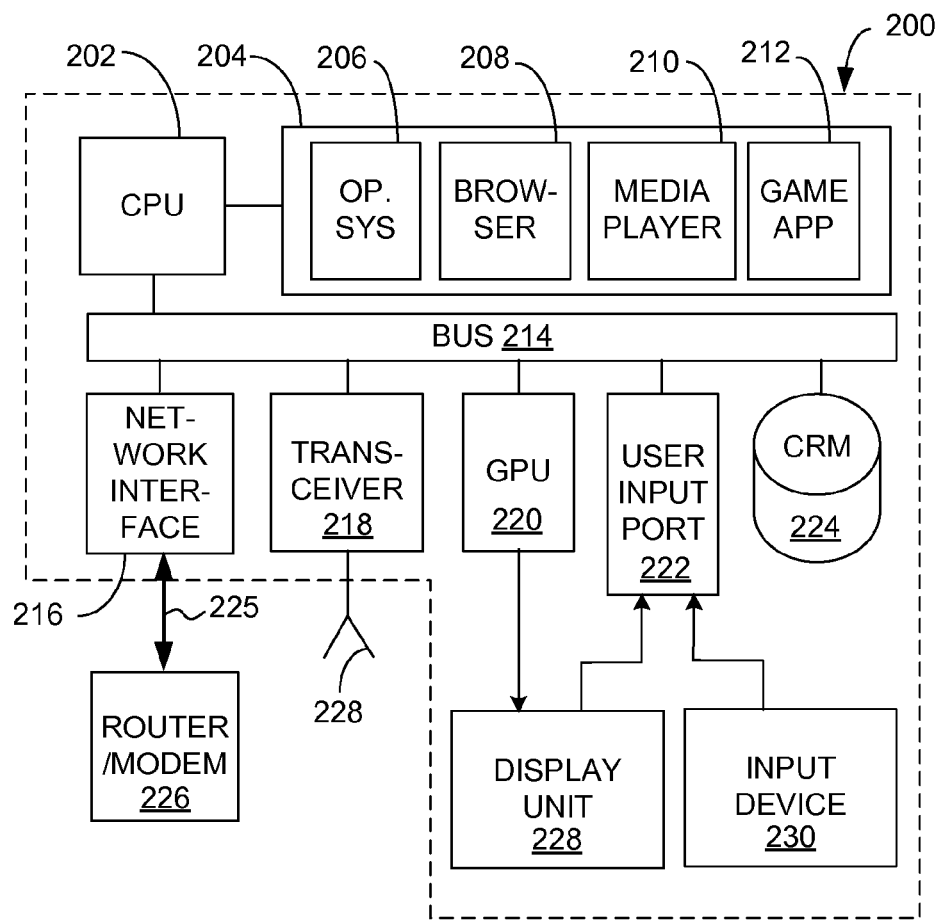
FIG. 2 is a schematic block diagram illustrating an embodiment of a client device for supporting and executing the systems and methods described herein.

Referring to FIG. 2, a diagrammatic view of an example client device 200 is illustrated. The client device 200 may be, or may include, a computer. One or more of the client devices 120, 122, 124, 126, 128 shown in FIG. 1 may be configured as, or may include, a computer or device configured as the device 200. In selected embodiments, the computer 200 may include a processor 202 operatively coupled to a processor memory 204, which holds binary-coded functional modules for execution by the processor 202. Such functional modules may include an operating system 206 for handling system functions such as input/output and memory access, a browser 208 for accessing information via the World Wide Web or similar network infrastructure, a media player 210 for playing streaming video and communicating with a streaming video system, and a game application 212 for providing a game result based on a random or quasi-random number generator and/or user input responding to game output.

A bus 214 or other communication component may support communication of information within the computer 200. The processor 202 may be a specialized or dedicated microprocessor configured to perform particular tasks in accordance with the features and aspects disclosed herein by executing machine-readable software code defining the particular tasks. Processor memory 204 (e.g., random access memory (RAM) or other dynamic storage device) may be connected to the bus 214 or directly to the processor 202, and store information and instructions to be executed by a processor 202. The memory 204 may also store temporary variables or other intermediate information during execution of such instructions.

A computer-readable medium in a storage device 224 may be connected to the bus 214 and store static information and instructions for the processor 202; for example, the storage device 224 may store the modules 206, 208, 210 and 212 when the client device 200 is powered off, from which the modules may be loaded into the processor memory 204 when the client 200 is powered up. The storage device 224 may include a non-transitory computer-readable medium holding information, instructions, or some combination thereof, for example instructions that when executed by the processor 202, cause the client device 200 to perform one or more operations of a method as described herein.

A communication interface 216 may also be connected to the bus 214. The communication interface 216 may provide or support two-way data communication between the client device 200 and one or more external devices, e.g., the streaming system 100, optionally via a router/modem 226 and a wired or wireless connection 225. In the alternative, or in addition, the client device 200 may include a transceiver 218 connected to an antenna 228, through which the client 200 may communicate wirelessly with a base station for a wireless communication system or with the router/modem 226.

The client device 200 may be connected (e.g., via the bus 214 and graphics processing unit 220) to a display unit 228. A display 228 may include any suitable configuration for displaying information to a user of the client device 200. For example, a display 228 may include or utilize a cathode ray tube (CRT), liquid crystal display (LCD), touchscreen LCD (e.g., capacitive display), light emitting diode (LED) display, projector, or other display device to present information to a user of the client device 200 in a visual display.

One or more input devices 230 (e.g., an alphanumeric keyboard, microphone, keypad, remote controller, game controller, camera or camera array) may be connected to the bus 214 via a user input port 222 to communicate information and commands to the client 200. In selected embodiments, and input device 230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 228, for example using a touch sensitive screen. A cursor control device may communicate direction information and command selections to the processor 202 and control cursor movement on the display 228. A cursor control device may have two or more degrees of freedom, for example allowing the device to specify cursor positions in a plane or three-dimensional space.

The client device 200 may be used to transmit, receive, display, or the like one or more streaming video segments. In selected embodiments, such transmitting, receiving, and displaying may be in response to the processor 202 executing one or more sequences of one or more instructions contained in main memory 204. Such instructions may be read into main memory 204 from another non-transitory computer-readable medium (e.g., a storage device 224).

Execution of sequences of instructions contained in main memory 204 may cause a processor 202 to perform one or more of the procedures or steps described herein. In selected embodiments, one or more processors 202 in a multi-processing arrangement may also be employed to execute sequences of instructions contained in main memory 204. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

The term "non-transitory computer-readable medium" as used herein may refer to any medium that participates in holding instructions for execution by a processor 202, or that stores data for processing by a computer. Such a medium may take many forms, including but not limited to, non-volatile media, volatile media, and temporary storage media (e.g., cache memory). Non-volatile media may include optical or magnetic disks, such as a storage device 224. Volatile media may include dynamic memory, such as main memory 204. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, any other memory card, chip, or cartridge, or any other memory medium from which a computer can read.

Figure 3:
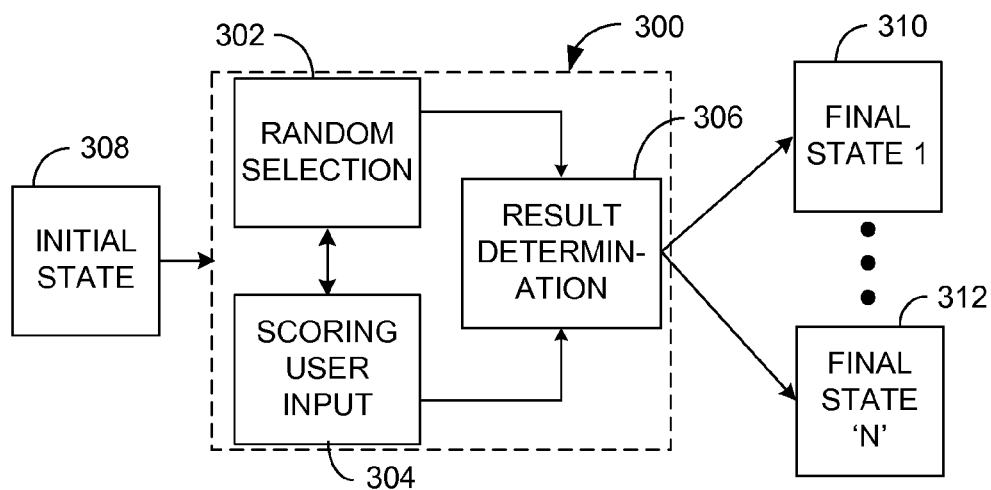
FIG. 3 is a state diagram illustrating general aspects of a game process as used for advertising selection or configuration of a streaming video segment.

Referring to FIG. 3, general aspects of a game process 300 used for selection or configuration of advertising in a streaming video segment are illustrated as a state diagram. The initial state 308 represents a selection of advertisements and corresponding slots of a selected streaming video segment. For example, for a 24 minute television episode, three or four slots may be provided totaling approximately six minutes, with a corresponding number of advertisements selected to fill the available slots according to an applicable rule set for advertisement selection. In addition, in some embodiments an excess number of advertisements may be selected for the initial state 308. The initial state 308 may be represented in a computer memory in various ways, for example by a list of advertising identifiers each identifying a specific video ad, and optionally one or more variables representing a number, duration and placement of ad slots, associated with an identifier for a streaming video segment and/or an identifier for a streaming video session with a particular client device. In an alternative embodiment, one or more of the number, duration and placement of ad slots may be determined by default based on an attribute of the video segment, such as run length. It should be apparent that the initial state 308 may be defined by data that represents prospective advertisements to be displayed during a video segment. As such, initial state data represents a physical state of a video output device that may be achieved at a later time when the video segment is played on a client device.

The game process 300 is (or includes) an input-output computation process performed by a computer processor, which operates on the initial state 308 to output one of several possible final states, including a first final state 310 and a last ("Nth") final state 312. Each of the final states 310, 312, etc., likewise represents a selection of advertisements and corresponding slots of a selected streaming video segment, generally without an excess number of advertisements. The game process 300 may therefore operate as a state machine that accepts the initial state 308 and optionally user input via an input device as inputs, and transforms the state data representing a physical state of a video output device into one of many ("N") final states. Subsequent, the final output state is realized in physical output from a streaming video segment that is configured based on a selected one of the final output states.

The game process 300 may include several interactive modules, for example, a random selection module 302, a scoring or tracking module 304 and a result determination module 306. In some embodiments, the game process 300 may include only one of the modules 302 and 304. The module 300 may include other modules, for example, a user interface module, physics module, graphics module, etc., which for illustrative simplicity are not shown. The random selection module 302 may include a random or quasi-random number generator executing in a computer process, for example, a linear congruential generator, a Mersenne Twister, a "/dev/random" algorithm (Linux and MAC OS) or a "CryptGenRandom" algorithm (Microsoft Windows). The random selection module 302 may provide input to the result determination module and/or to the scoring or tracking module 304. The scoring or tracking module 304 records progress of the game, for example recording significant game events and/or maintaining a cumulative game score. The scoring/tracking module may exchange data with the random selection module 302 in embodiments using a mixed game process based on chance and user skill. The scoring/tracking module 304 may also determine when the game is ended. The result determination module 306 determines the final state based on input from the random selection module 302 and/or the scoring/tracking module 304.

Figure 4:
FIG. 4 is a line diagram illustrating aspects of a video segment including ad slots.

FIG. 4 is a line diagram illustrating aspects of a video segment timeline 400 including ad slots 406, 408 and 410. A video segment includes video data characterized by a sequence of video frames that are output in order at a defined frame rate to generate video output. At such, a video segment includes an initial or first frame at inception time "$t_0$" 402 of a video output, and each subsequent frame is output at a defined time "t" after inception until a terminal or end time "$t_e$" 404. Thus, each frame defines a particular time or "temporal point" in the streaming video segment, typically measured from the time of inception. For example, for a video configured for 30 frames per second, the 300$^{th}$ frame defines a temporal point 10 seconds after inception. A temporal point in a streaming video segment may sometime be referred to herein as a "location" in relation to a progress bar, time line or other time indicator.

Any non-negative, integral number of ad slots 406, 408 and 410 may be configured in the video time line. Each ad slot may be defined by a location and duration. For example, the first ad slot 406 is located at "$t_0$" and has a duration of "$t_1-t_0$"; the second ad slot 408 is located at "$t_2$" and has a duration of "$t_3-t_2$"; and the third ad slot 410 is located at "$t_4$" and has a duration of "$t_5-t_4$". The inter-slot portions 412, 414 and 416 are used for playing requesting video content, and the ad slots are used for playing video advertisements. In video streaming embodiments, a streaming media player operating on the client device may cause the video content to play in the defined inter-slot portions 412, 414, 416 and receive streaming advertising videos of appropriate duration for playing in all of the ad slots 406, 408, 410. The duration of the ad slots may be predetermined, or may be determined on an ad hoc basis based on the duration of respective video ads streamed to the media player for playing in respective ones of the ad slots.

Figure 5:
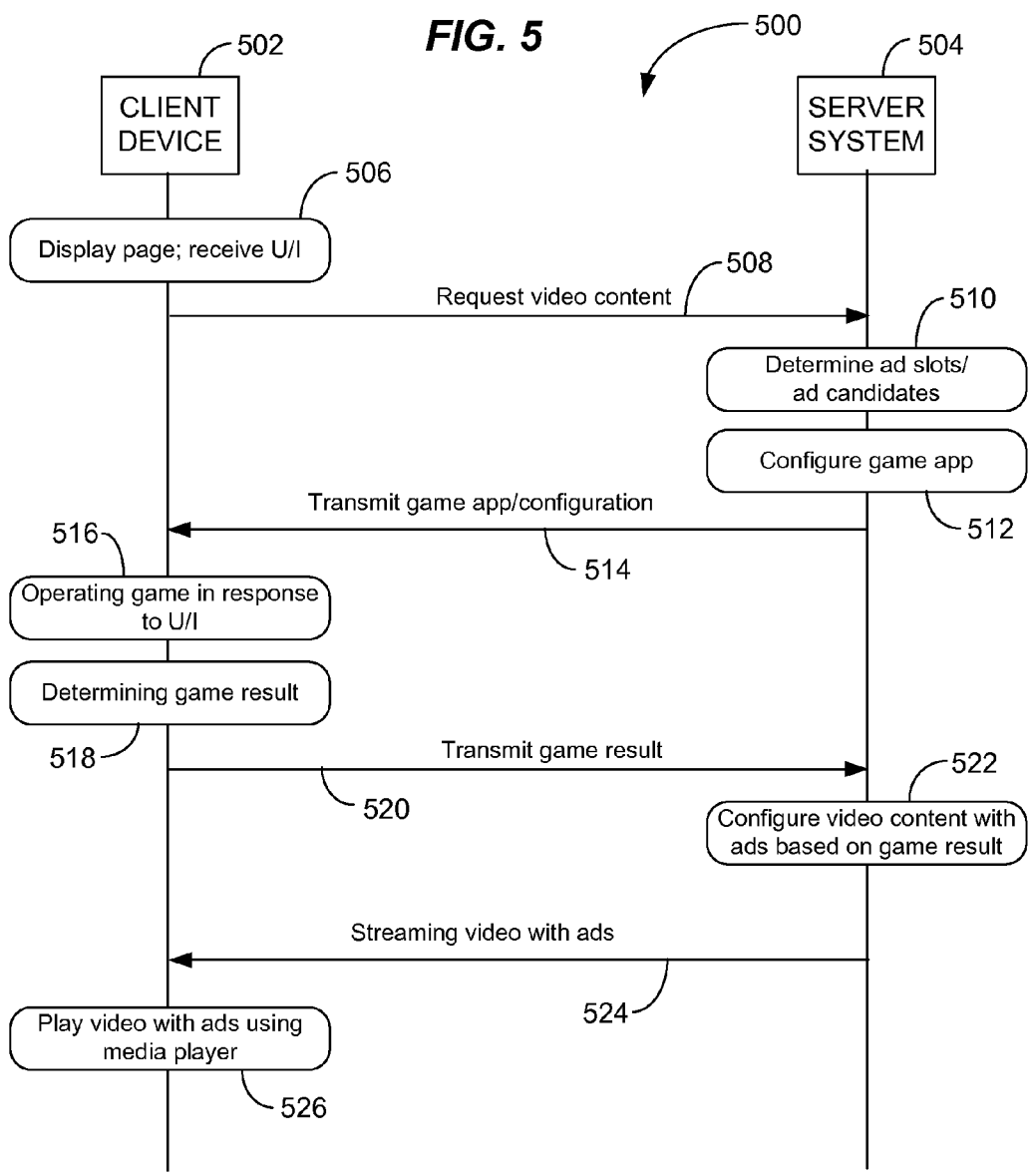
FIG. 5 is a sequence diagram illustrating an example of a call flow between a server system and a client device implementing configuration of advertising in streaming video based on a game result.

FIG. 5 illustrates an example of a call flow 500 between a server system 504 and a client device 502 for selection and configuration of video advertising in a streaming video, based at least in part on a game result. The call flow 500 assumes video streaming is provided through a web page interface and streaming media player installed at the client device; however, the inventive concepts herein are not limited to such environments. If a web page environment is used, a call flow may initiate, at 506, with the client device 502 displaying a web (e.g., World Wide Web) page received from the server system 504 including links for requesting one or more video segments. For example, the web page may comprise a "home" or personalized page including a list of selected video segments of general interest, or selected as likely to be of interest to a specific user based on a user profile. The client device may receive 506 user input selecting one of the links, for example, a "point and click" input from a pointing device, a touch input on a touchscreen device, or a spoken command. In response to the input, the client device may request a specific video segment 508 by transmitting a Hypertext Transfer Protocol (HTTP) "get" request, or other suitable request message, to the server system 504.

In response to receiving the request message 508, the server system 504 may, at 510, determine a selection of advertising videos and ad slots for the video segment requested by the request message. In so doing, the server system may access a record pertaining to user preferences or past activity by a user identified, for example by a user account, as making the request for the video segment. Any suitable method may be used to select an initial set of candidate advertisements, which optionally may include an excess number of ads (e.g., a number greater than the available ad slots). An output of the determining process 510 may include the initial state information 308 shown and described in connection with FIG. 3.

In addition, the server system may, at 512, select and/or configure a game application to be used in an ad selection or configuration process. In some embodiments, the server system may retrieve a distributable game application from a game server for providing to the client device 502. A game application may be selected by the server from numerous possibilities, based on user input. In other embodiments, the game application may already be stored and installed on the client device, with the media player application and other client-side components. In either case, the server system 504 may, at 514, transmit the initial state information (candidate ad identifiers and slot information) to the client device, with or without the game application itself. The server system 504 may include a web page or other information with the game configuration, for initiating play of a selected game on the client device.

The client device 502 may, at 516, initiate operation of the selected game application, using the initial ad state information as input, in response to receiving the state information at 514. The game process may operate to select one or more advertisements from the list of candidate ads in the initial state information, and/or to determine a number, location or duration of ad slots in the video segment, based on random input to a game of chance, user input to an interactive game of skill, or a combination of random and user input to a combined game of skill and chance. More detailed examples of game processes are described elsewhere herein. At 518, the client device may determine a game result, i.e., one of the final states 310, 312, etc., shown in FIG. 3.

At 520, the client device 502 may transmit the game result—i.e., final game state, which may include a selection of advertisements and/or ad slot configuration for the video segment—to the server system 504. The server system 522 may configure a video streaming segment based on the game result, for example by preparing the streaming segments with the selected advertisements inserted at the designated ad slots. In some embodiments, in case the game results satisfy a defined winning condition, the number of ad slots may be zero, and the server system may configure the streaming video segment without the usual ad slots. At 524, the server system 504 may stream the video segment configured with advertising determined based on the game results, or without any advertising based on the game results. At 526, the client device may play the streaming video segment configured with advertising based on the game results using a media player component. Thus, the client device 502 and server system 504 may cooperate to produce video output configured based on a result of a game process. The game process may therefore operate to transform data representing video output to a different state, while engaging the user of the video streaming service in an entertaining and rewarding activity.

Figure 6:
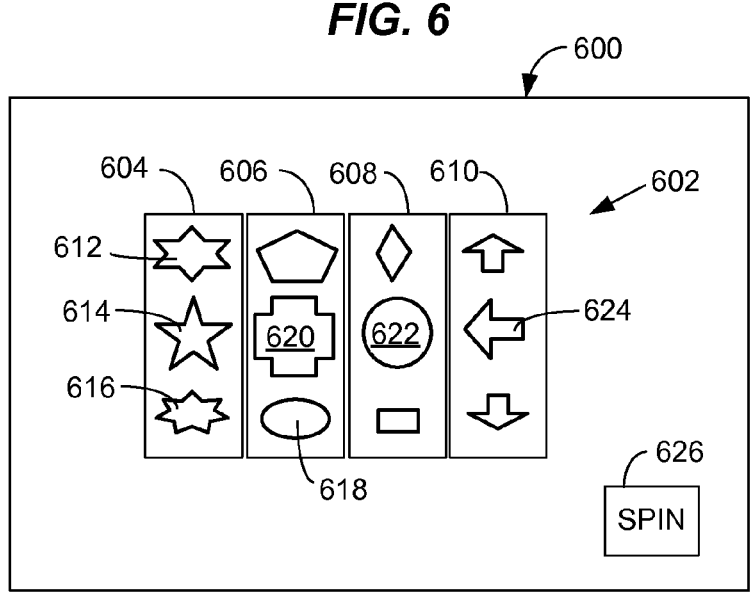
FIG. 6 is a diagram illustrating a simplified screenshot of a game of chance for determining selection or configuration of advertising in a streaming video segment.

The game process itself may include a great variety of graphical user interfaces and game play. A few examples are provided herein, by way of example, and not by way of limitation. In some embodiments, a pure game of chance may be provided. FIG. 6 illustrates a simplified screenshot of a game interface 600 such as may be displayed by a client device during a game of chance for determining advertising selection or configuration of a streaming video segment. The game of chance may include "spinning" virtual reels 602 displaying a plurality of symbols to determine a final symbol set. In the depicted example 600, four virtual reels 604, 606, 608 and 610 are shown, corresponding to four possible advertising slots for a certain video segment. Each symbol in the final set may indicate an ad selection, for example by depicting an icon or logo for a company sponsoring a particular ad, for a particular slot. For example, symbols 612, 614 and 616 shown on the first virtual reel 604 may correspond to and indicate different advertisement candidates for a first ad slot. The virtual reel 604, like the other reels, may also be assigned other symbols that are not visible all of the time, for example, as the reels "spin" the symbols may be caused to appear and disappear as if spinning on a physical reel, using any suitable algorithm.

Certain symbols on the reels 602 may be correlated to some other outcome or reward. For example, circular symbols 618, 622 may represent a "no ad" outcome wherein no ad is played in a particular ad slot, which is therefore removed from the video segment to permit play that is uninterrupted by the removed slot. Thus, for example, if the game interface screenshot 600 represents a final game outcome, the symbols appearing in the center line of the reels 602 determine the game result, in the illustrated example five-pointed star 614, cross 620, circle 622 and left-facing arrow 614. If the circle 622 indicates "no ad," then advertisements indicated by the respective symbols 614, 620 and 624 can be played in the first, second and fourth slots, while no ad is played in the third slot.

The game interface 600 may include one or more control objects for initiating a "spin" of the virtual reels or otherwise influencing game play, for example a "spin" button 626. When the client detects user input activating the "spin" button 626, the client may initiate a game process on the client device or server system, for example as described below in connection with FIG. 7. In the alternative, the game of chance may be initiated automatically in response to selection of a video segment, without any further user input. The user interface may include other controls, for example control objects for emulation of traditional slot machine functions for making game play more interesting, or a "cancel" object (not shown) enabling a user to opt out of the game process if desired.

The user interface 600 may include an animation of spinning reels 602, or the like, after a game is initiated. The animation may be purely for visual effect and not determinative of a game outcome. The animation may be generated at the server system and rendered as frame-based video for play at a media player on the client device. In the alternative, generation and rendering of the game play application may be performed by the client, rendering frame-based video output for display via the media player application or by a separate game application interface.

The game outcome or result may be determined by a random or quasi-random number generator, implemented in any suitable algorithm for selecting a result based on an input value of random (or apparently random) value. Various algorithms are known in the gaming arts, and may be adapted to achieve results that in aggregate can achieve any desired statistical result (e.g., number of resulting ad slots per unit time of streaming video content) while being entirely unpredictable in any specific game. Thus, a user may enjoy the unpredictability of a game of chance, including sporadic rewards of viewing requested video content with less than a normal amount of interruptions for video advertising, without depriving the system operator of optimal opportunities for selling advertising in the aggregate.

Figure 7:
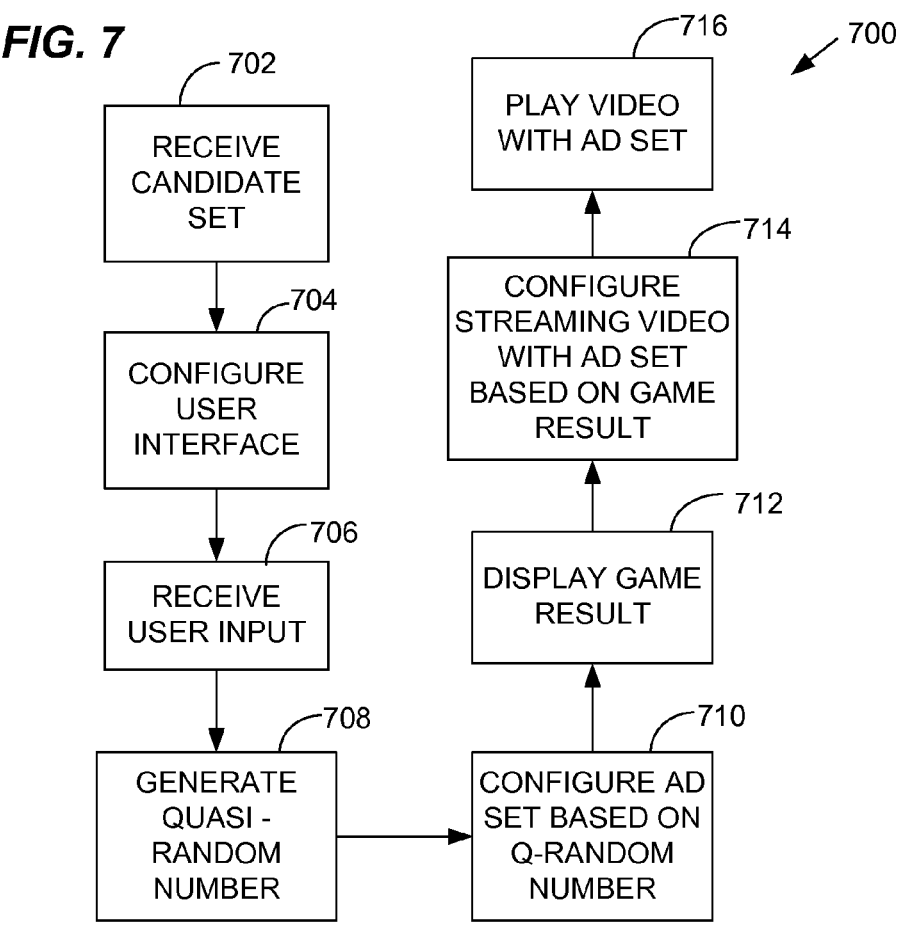
FIG. 7 is a flow chart showing aspects of using a game of chance for determining selection or configuration of advertising in a streaming video segment.

FIG. 7 illustrates aspects of an algorithm or method 700 for using a game of chance to determine selection or configuration of advertising in a streaming video segment, such as may be performed by a client device, server system, or combination of client and server. Each of the illustrated operations of the method 700, except for receiving user input 706, displaying the game result 700 and playing the resulting video 716 may be performed by the client or server, or some combination of client and server. Receiving user input 706, displaying of game results 712 and playing the video segment with ads 716 should be performed by the client device. The method 700 may include, at 702, receiving a defined candidate set of advertising for a defined ad slot configuration in a requested video segment. The candidate set may include a table of advertising identifiers, wherein each identifier represents a corresponding video advertising clip stored in a system memory or otherwise defined and available. The candidate set may include other information defining a number, location and duration of ad slots for the requested video segment.

The method 700 may further include configuring a user interface 704 for a selected game of chance, for example a "slot-machine" interface as shown in FIG. 6, or any other desired graphical user interface for depicting game activity. In some embodiments, a user may provide selection input indicating a desired interface from two or more optional interfaces, for example, interfaces emulating the actions of a slot-machine, roulette wheel, dice game, card game, or other game of chance. The client and/or server may configure and generate a user interface based on the user selection or indicated preference. Thus, the system may add variety and interest to the game activity. The client device may display the user interface on a display device or the like, thereby alerting the user that game play is about to begin. Optionally, the client device may receive user input 706 indicating a user request to initiate the game of chance. In an alternative, the game of chance may be initiated automatically by the client or server.

Once the game is initiated, at 708, a random or quasi-random number generating algorithm may be executed at the client or server, to provide one or more random or quasi-random numbers. For example, an algorithm as identified herein above may be executed. At 710, selection of advertising and configuration of ad slots may be based on the one or more numbers provided by the number-generating algorithm. For example, for a "reel" type game, each reel may be populated with a plural number of outcomes corresponding to an ad slot, including one or more "no ad" outcomes, and each outcome assigned a number between 1 and "N," wherein "N" represents the number of possible outcomes. Each outcome may be assigned an equal probability, for example, by normalizing a random number result, or portion thereof, to return a number between 1 and "N," and selecting the outcome based on the returned number. For example, if ten outcomes are possible per reel in a four-reel game, the outcome of each reel may be determined by a corresponding digit of a four-digit random number in base 10. For further example, if only five outcomes are possible per reel, each outcome may be provided with an equal probability by dividing each corresponding digit of the four-digit base 10 number by two, and rounding the result down to the nearest integer. Any suitable algorithm may be used to configure the ad set based on the random or quasi-random number, and the foregoing example are by way of illustration only. Configuring the ad set 710 may include, for example, determining the number, location and duration of each ad slot, and selecting an ad from a plural number of candidates for each of one or more of the ad slots based on the random or quasi-random number.

Then, the client device may optionally display the game result 712, for example by preparing an animation of game play based on the selected user interface, rendering the animation, and outputting the animation. In an alternative, the server system may render and prepare the animation, and transmit to a media player component on the client device. The animation may terminate with a screen indicating the advertisements selected and number of ad slots, for example, or other information. If the game result is determined on the client device, it may transmit the result to the server system for use in configuring a streaming video segment. The server system may configure, at 714, a streaming video based on the number, duration or location of ad slots determined by the game results with ads selected by the game results, or some combination of the foregoing. The server system may stream the configured video segment to a media player component operating on the client device, which at 716, may play the streaming video, causing the video segment to be displayed on a display device with a number and/or selection of inserted video advertisements as determined by the game result.

Figure 8:
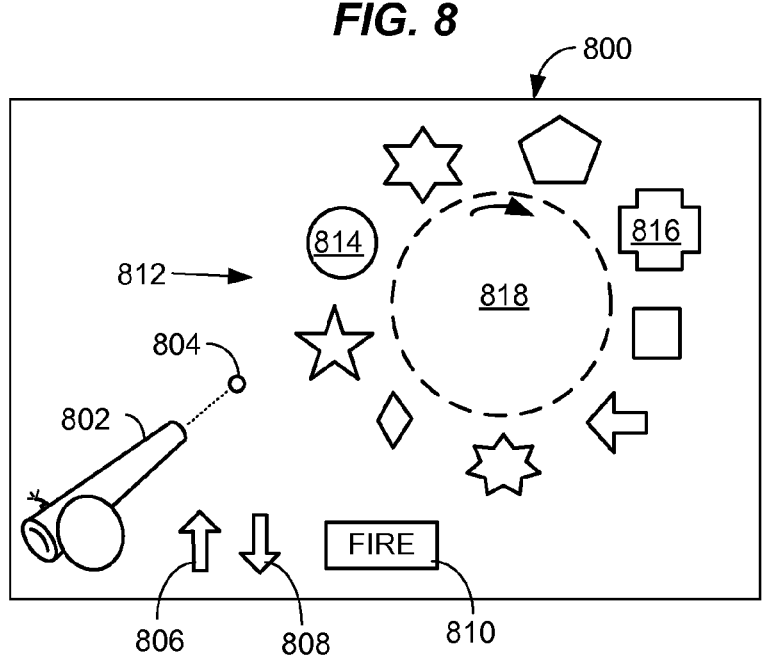
FIG. 8 is a diagram illustrating a simplified screenshot of an arcade-style game of skill for determining selection or configuration of advertising in a streaming video segment.

In some embodiments, the user may be presented with the option of playing a game of skill to determine a game result. FIG. 8 illustrates a simplified screenshot of a user interface 800 for an arcade-style game of skill for determining selection or configuration of advertising in a streaming video segment. A "game of skill" may include, for example, games in which the timing, speed, and selection of defined user inputs determines a game result in connection with corresponding events depicted in an animated game environment. Such games may include arcade or action games of various types, for example, video pinball games, shooting games, racing games, and so forth. Other games of skill may include posing logical puzzles of various types for solution by the user, with or without a time limit, for example, geometric "jigsaw" puzzles, fitting games such as exemplified by Tetris™ or the like, word puzzles of various types, and innumerable other puzzle games that can be implemented as a computer video game. The user interface 800 shows a simplified example of an arcade style shooting game, by way of example only, and not by way of limitation.

In the depicted example 800, a wheel 818 of symbols 812 rotates in the game interface via a video animation process, providing moving targets for shooting using a modeled gun 802. It should be apparent than numerous other modes of movement may be modeled in a gaming environment, and rotation of a symbol wheel is merely an easily illustrated example of more complex challenges that may be posed by moving symbols, avatars, or other modeled objects through and in a modeled game environment. Likewise, although a two-dimensional (2D) interface 800 is depicted, it should be appreciated a modeled three-dimensional (3D) game environment may also be desirable. The rendered movement of the symbols 812 or other objects may be performed locally at the client device or at some network location (e.g., a game server), and merely displayed at the client device.

The game environment may include an object for interacting with the moving target symbols, for example the gun 802, which may fire a virtual cannonball 804 through the game environment 800 under the control of user input directing the aim and firing of the gun 802. The game environment may include one or more interactive objects, for example aiming icons 806, 808 and a " "fire" button 810 activated in response to input from a pointing device or touchscreen, or responsive to keyboard, voice commands, touchscreen input, or some combination of these or other inputs. In response to input indicating the gun 802 should be fired, the game engine may calculate or select a modeled trajectory of the fired object 804, based on some rule (e.g., Newton's laws of motion with parameters appropriate for the game interface), and determine which, if any of the target objects 812 are intersected by the cannonball 804 trajectory. The game engine may animate motion of the cannonball and a strike showing the calculated impact on the targeted object, optionally assigning a score based on which objects are struck. Each target object may be correlated to a particular ad or other outcome, for example a "no-ad" outcome. For example, if a cannon shot impacts the target object 814, then the user may be credited with a reduced number of ad slots for the streaming video segment; while if the shot impacts a different target, for example object 816, an ad corresponding to the object 816 is selected. The game may continue until all ad slots are configured and filled with a selected ad, or until expiration of a timer, whichever occurs first.

Figure 9:
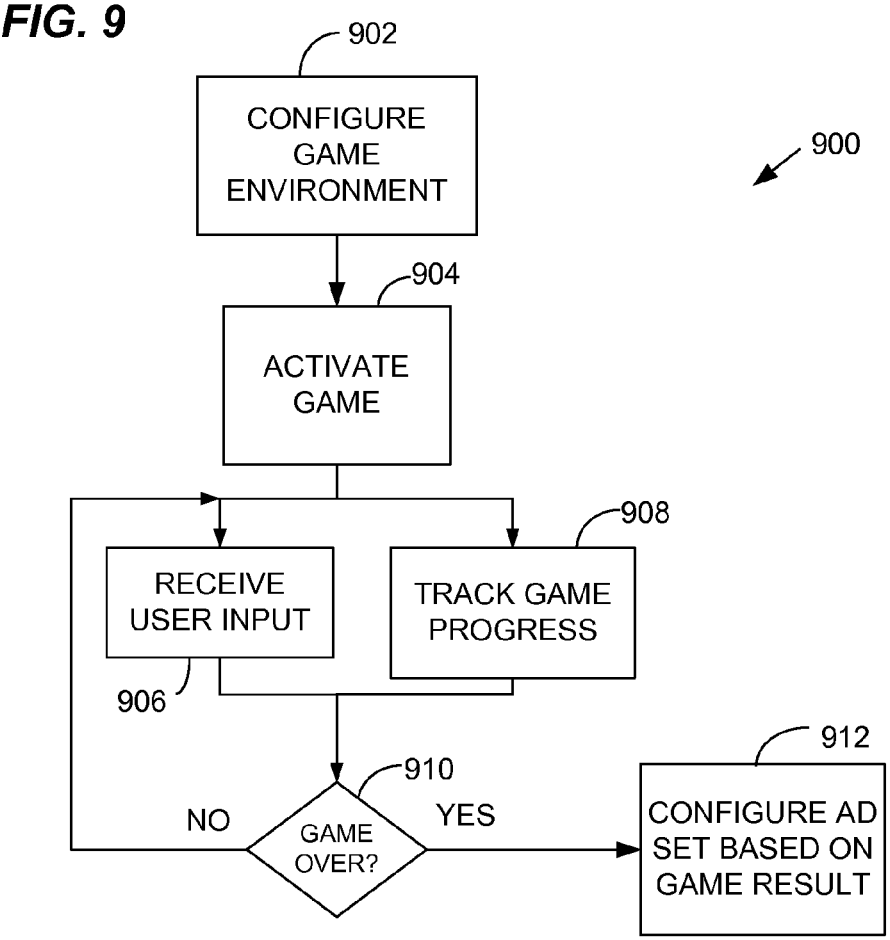
FIG. 9 is a flow chart showing aspects of using an arcade-style game of skill for determining selection or configuration of advertising in a streaming video segment.

FIG. 9 shows aspects of an algorithm or method 900 for using an arcade-style game of skill for determining selection or configuration of advertising in a streaming video segment, for example as illustrated by the user interface 800. Other aspects may be as illustrated by FIG. 7, or as described elsewhere herein. The operations of method 900 may be performed by a client device, server system, or some combination of the foregoing. The method 900 may include, at 902, configuring an interface for a game of skill, optionally in response to user input indicating a selection of one of several possible games. Since users typically vary in their interest and abilities with games of skill, it may be advantageous to offer multiple options from which a user may select a preferred game, or no game at all. Configuring the game environment may include executing a selected game application on a client device and/or game server, initializing the game with an initial advertising configuration state for a specified video segment, as previously described, and rendering an initial or home environment for the selected game.

The method may include, at 904, activating the game, for example in response to user input. Once activated, the game may operate according to predefined rules in response to user input. These rules may include elements determined at random, in addition to elements based on pre-defined rules and responses to user input. Operating the game may include, at 906, receiving user input indicating performance of one or more actions under user control in the game environment. Concurrently, the method 900 may also include tracking progress of the game, for example, recording significant events (e.g., achieving a predefined objective or an ad selection or slot configuration) or tallying a cumulative score in response to game events. The method may include continuing game play until determining, at 910, that the game of skill is ended. In some embodiments, game play may continue until all ad slots are configured and filled with a selected ad, or until expiration of a timer, whichever occurs first. The method 900 may further include, at 912, configuring an ad set for the selected video segment based on game results, and other operations as previously described in connection with FIG. 7, and elsewhere herein.

Figure 10:
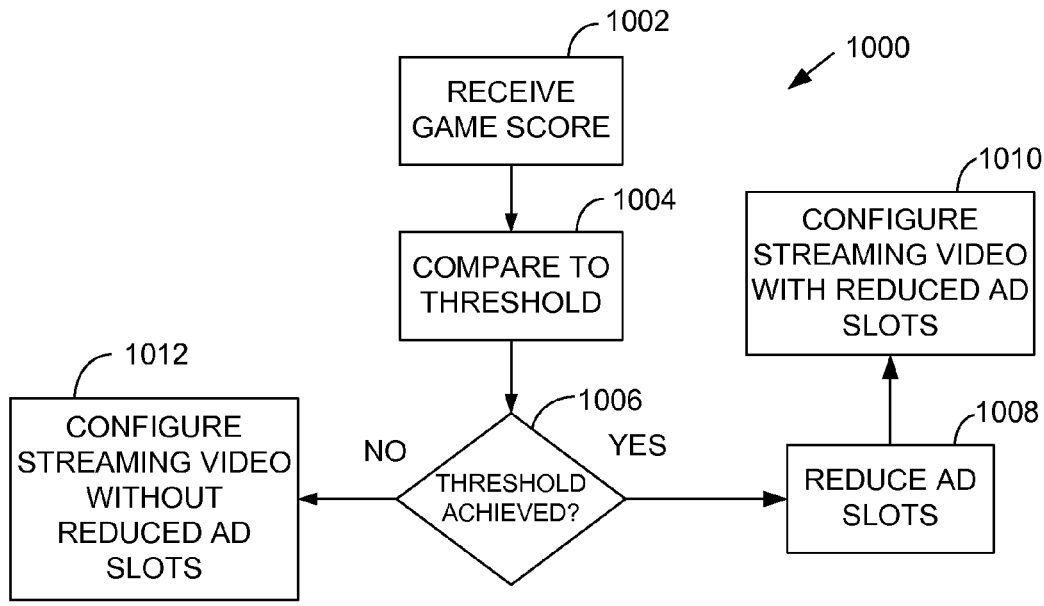
FIG. 10 is a flow chart showing aspects of using an arcade-style game of skill for determining selection or configuration of advertising in a streaming video segment based on a user score.

In an aspect, game results may depend in whole or in part based on a cumulative game score achieved by the user during game play. FIG. 10 shows aspects of a method 1000 for using an arcade-style game of skill for determining selection or configuration of advertising in a streaming video segment, based on a user score. Game play to obtain a score may proceed as previously described. The method 1000 may be initiated by a client device, server system, or some combination of the foregoing, based on a score that is already determined. The method 1000 may include, at 1002, receiving a score from a game process, which may be associated with a request for a specific video segment, or designated for use in configuring advertising for the specific video segment. The method may further include, at 1004, comparing the score to a specific threshold predetermined for the specific video segment or game process from which the score is obtained. More than one threshold may be used; for example, various thresholds may be assigned with different reward levels, such that the higher the score, the more ad slots may be reduced or eliminated. If, at 1006, the score does not achieve the threshold, the designated streaming content may be configured with a default ad set and/or amount of ad slots for video advertising. Conversely, if the score does achieve at least one threshold, the system may reduce the number and/or duration of ad slots 1008, and at 1010, configure the streaming video with appropriate selected advertisements based on the reduced number or duration of ad slots.

Figure 11:
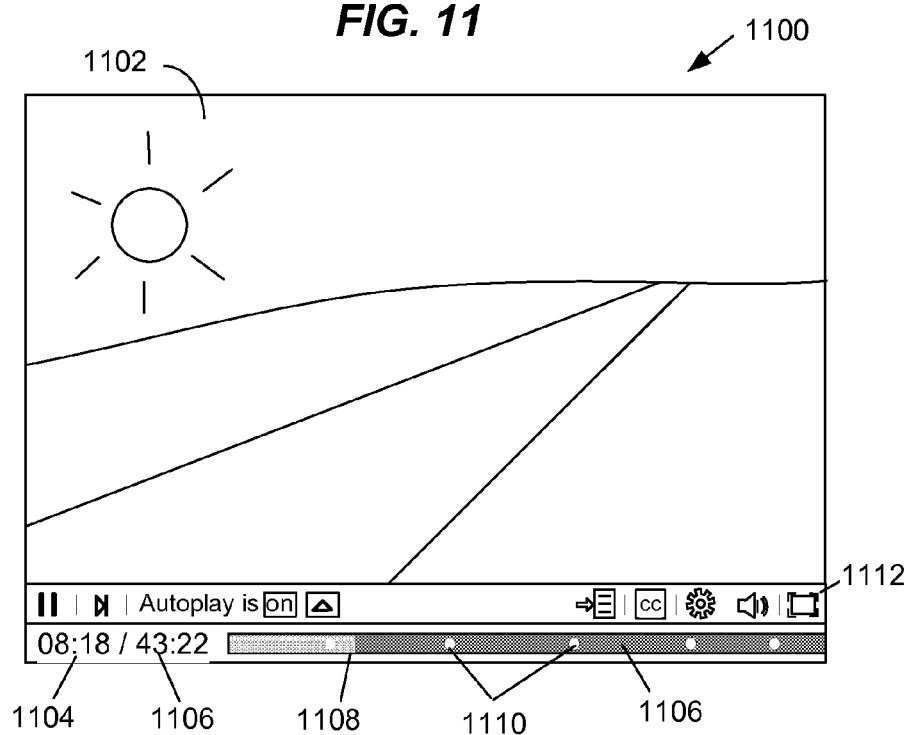
FIG. 11 is a diagram illustrating a simplified screenshot of a user interface for playing a streaming video segment including advertising at designated ad slots.

By way of example only, FIG. 11 illustrates a simplified screenshot of a user interface 1100 for playing a streaming video segment including advertising at designated ad slots determined by game results. The user interface 1100 may be output by a media player component as described herein to a display device connected to, or incorporated in a client device. The interface 1100 may include a window or screen area 1102 in which frames of the streaming video segment are successively displayed, including advertising during defined ad slots. The interface may further include a current time indicator 1104 and a total length indicator 1106. The interface 1100 may include progress bar or timeline 1106 for the video segment, which may include graphical indications 1110 of ad slots defined in the timeline, and an indication of current progress 1108 relative to the timeline 1106. The interface 1100 may include other features that are not the subject of the present application.

The foregoing examples may be embodied in one or more methodologies performed by a computer, for example a client device, server, or some combination of a client device and server. Methodologies that may be implemented in accordance with the disclosed subject matter will be better appreciated with reference to various flow charts. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method could alternatively be represented as a series of interrelated states or events, such as in a state diagram.

Video Host Server Operations and Apparatus

Figure 12:
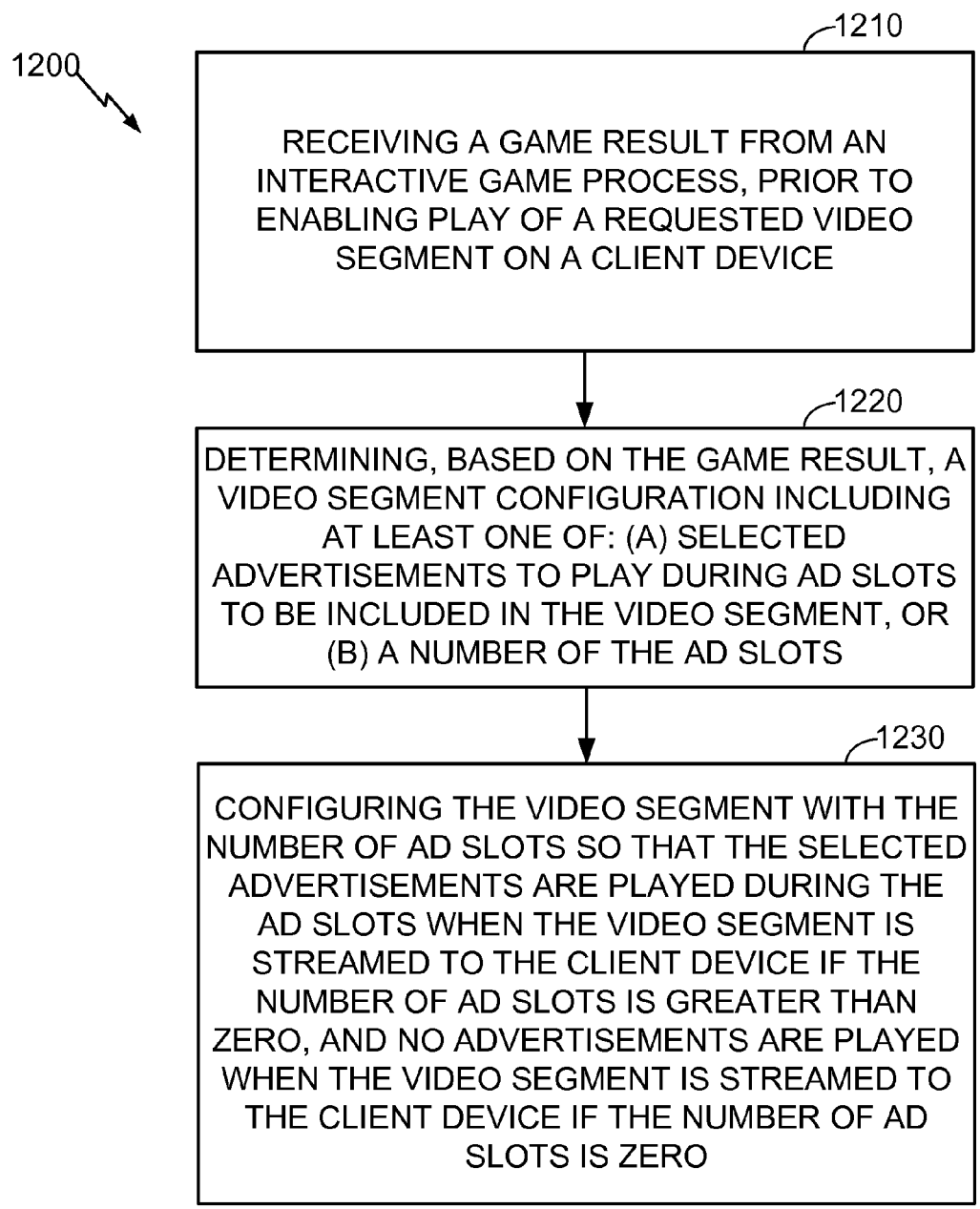

As shown in FIG. 12, a network node of a computer server system may perform a method 1200 for determining selection or configuration of advertising in a streaming video segment based on results of a computer game process. The method 1200 may include at 1210, receiving a game result from an interactive game process, prior to enabling play of a requested video segment on a client device. The game process may be operating on the client device, or on a network node receiving input from the client device and providing game output for display on the client. Preceding operations may include receiving a request to play the segment from the client device, and linking a result for a particular interactive game process to configuration of advertising for the requested segment, based on user input and/or other factors. The game result may include, for example, a selected set of advertisements selected from a larger candidate set, identified, for example, by a list of identifiers. In addition, or in an alternative, the game result may include a number, location, or duration of ad slots to be provided in the requested video segment, based on the game process. In addition, or for further alternative, the game results may include a quantitative score or one or more random or quasi-random numbers.

The method 1200 may further include, at 1220, determining, based on the game result, a video segment configuration including at least one of: (a) selected advertisements to play during ad slots to be included in the video segment, or (b) a number of the ad slots. For example, if the game results identify a list of advertisements, the server may configure a video segment with the listed advertisements appearing at the designated slots. If the game results include a random or quasi-random number or score, the network node may determine an ad selection or a number, location, or duration of ad slots to be provided in the requested video segment, based on the random or quasi-random number or score.

The method 1200 may further include, at 1230, configuring the video segment with the number of ad slots so that the selected advertisements are played during the ad slots when the video segment is streamed to the client device if the number of ad slots is greater than zero, and no advertisements are played when the video segment is streamed to the client device if the number of ad slots is zero. For example, a video streaming module may be provided with instructions specifying the ad slot configuration of a particular streaming instance to an identified client device or user account. The video streaming module may obtain ads as identified by a controller based on the game result, if any, and insert the ads at the indicated slot locations, if any. If no ad slots are indicated, the video streaming module may stream the video segment to the identified client without ads. Thus, the server may cause the number and selection of video advertisements appearing in a requested video segment to vary based on game results from a game process specifically identified for an instance of video streaming to a particular client device.

With reference to FIGS. 13-17, several additional operations 1300, 1400, 1500, 1600 and 1700 are depicted for determining selection or configuration of advertising in a streaming video segment based on results of a computer game process, which may be performed by a computer server, alone or in combination with a client device and/or another server. One or more of operations 1300, 1400, 1500, 1600 and 1700 may optionally be performed as part of method 1200. The elements 1300, 1400, 1500, 1600 and 1700 may be performed in any operative order, or may be encompassed by a development algorithm without requiring a particular chronological order of performance. Operations can be independently performed and are not mutually exclusive. Therefore any one of such operations may be performed regardless of whether another downstream or upstream operation is performed. For example, if the method 1200 includes at least one of the operations 1300, 1400, 1500, 1600 and 1700, then the method 1200 may terminate after the at least one operation, without necessarily having to include any subsequent downstream operation(s) that may be illustrated.

In an aspect, with reference to FIG. 13, the method 1200 may further include, at 1310, inferring a demographic characteristic from the game result. For example, in a game of skill based on reflexes and knowledge of similar games popular with young males, a young male gender characteristic may be inferred for scores above a threshold. For further example, for a word puzzle game based on vocabulary and knowledge of historical events, an age and/or education level may be inferred from scores exceeded certain thresholds. The method 1200 may further include, at 1320, determining the selected advertisements based at least in part on the demographic characteristic; for example, advertisements designed to be of greater interest to the inferred demographic may be selected for including in the streaming video segment.

In other aspects, with reference to FIG. 14, the method 1200 may further include, at 1410, transmitting identifiers for prospective video advertisements to the client device for use in the interactive game process. For example, the network node may select a list of candidate advertisements, and provide the list to the client device for use in the game process. In an alternative, the network node may retain the identifiers for prospective video advertisements in a network memory, without transmitting to a client device. The method 1200 may further include, at 1420, selecting a number of the prospective video advertisements that is greater than a default number of ad slots in the video segment, prior to transmitting the identifiers, or prior to holding the identifiers in a network memory location. That is, the number of candidate ad identifiers in the candidate set may exceed the maximum number of ad slots defined for a particular video segment. The method 1200 may further include, at 1430, receiving the game result comprising a set of identifiers of selected advertisements selected from the identifiers for the prospective video advertisements. The game result may be received from the client device, or in an alternative, if the game process is performed at a network node, by a network component that performs the game process.

In other aspects, with reference to FIG. 15, the method 1200 may further include, at 1510, transmitting an interactive game application to the client device, wherein the interactive game application is configured to operate on the client device to provide a user interface for the interactive game process. For example, a user interface for a game application may be transmitted in the form of a distributable application to the client device, in response to the request for the video segment, or at some earlier time. The game application may include one or more functions that are performed by a network node, or may be performed entirely at a client node. The game application may be selected form various different types, as disclosed herein.

For example, the method 1200 may further include, at 1520, including a random or quasi-random function in the interactive game application influencing the game result, as described in more detailed examples above. The method 1200 may further include, at 1530, including a logical puzzle function in the interactive game application, such that success of activity directed to solving the logical puzzle influences the game result, for example, as described in more detailed examples above. The method 1200 may further include, at 1540, including an arcade-style video game function in the interactive game application, such that a player score or objective achieved in playing the arcade-style video game influences the game result, for example, as described in more detailed examples above.

Figure 16:
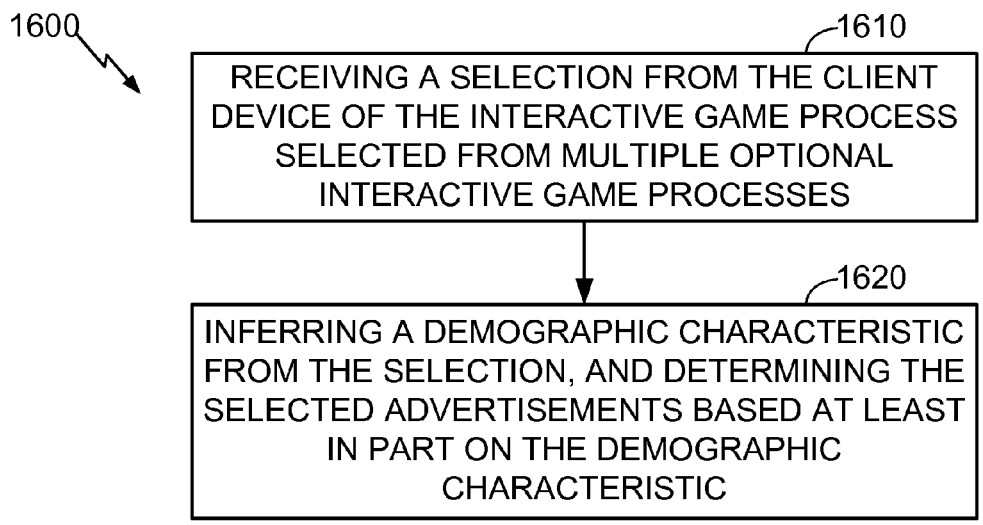

In one embodiment, with reference to FIG. 16, the method 1200 may further include, at 1610, receiving a selection from the client device of the interactive game process selected from multiple optional interactive game processes. For example, different types of games of chance, logical puzzle games, or action/arcade style games may be presented on a client display device as alternative choices in a selection menu or the like. The method 1200 may further include, at 1620, inferring a demographic characteristic from the selection, and determining the selected advertisements based at least in part on the demographic characteristic. For example, a female demographic 18-24 may be inferred from a user selection of a game designed and shown to appeal most strongly to users in that particular demographic. Accordingly, for a video streaming session associated with a user-selected game, the ad system may select an appropriate set of ads for the demographic inferred from the game selection.

Figure 17:
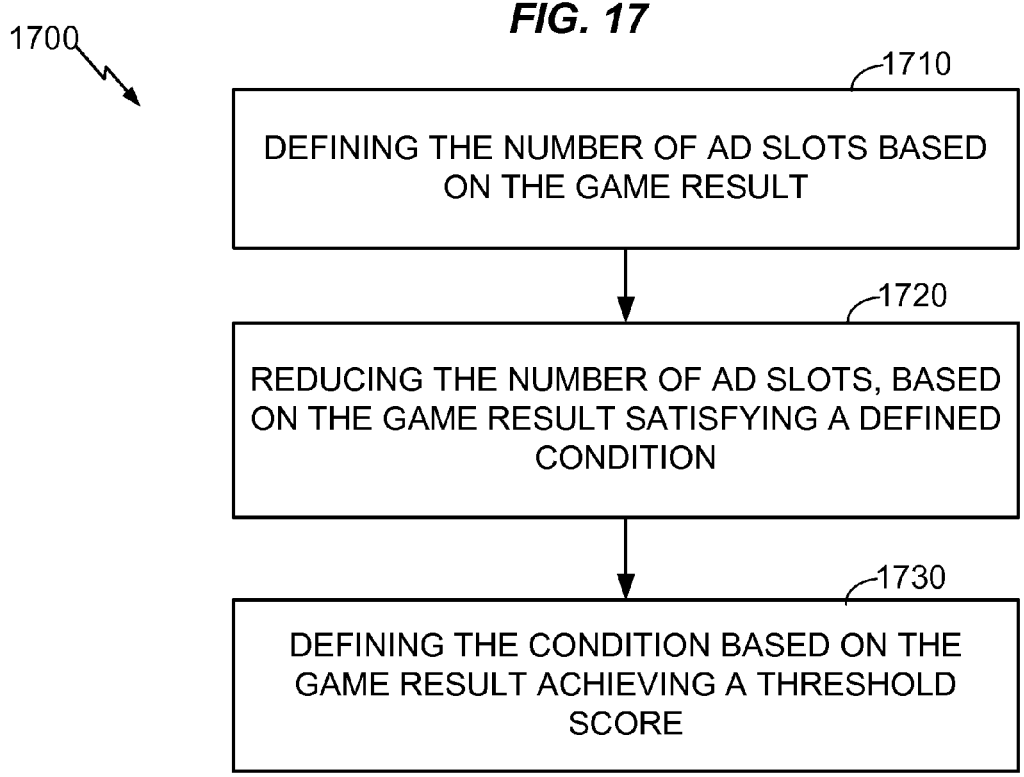

In one embodiment, with reference to FIG. 17, the method 1200 may further include, at 1710, defining the number of ad slots based on the game result. For example, ad slots may be reduced based on a chance outcome, event or objective achieved in a game of skill, or score achieved in a game of skill, such as illustrated, for example, by the more detailed examples herein above. For further example, the method 1200 may further include, at 1720, reducing the number of ad slots, based on the game result satisfying a defined condition or event. For further example, as described in more detail above in connection with FIG. 10, the method 1200 may further include, at 1730, defining the condition based on the game result achieving a threshold score. For example, the condition may be defined so as to require that a game score exceeds a defined threshold. The client device or server may determine if the condition is satisfied, and if so, reduce the number of ad slots or take other specified actions.

Figure 18:
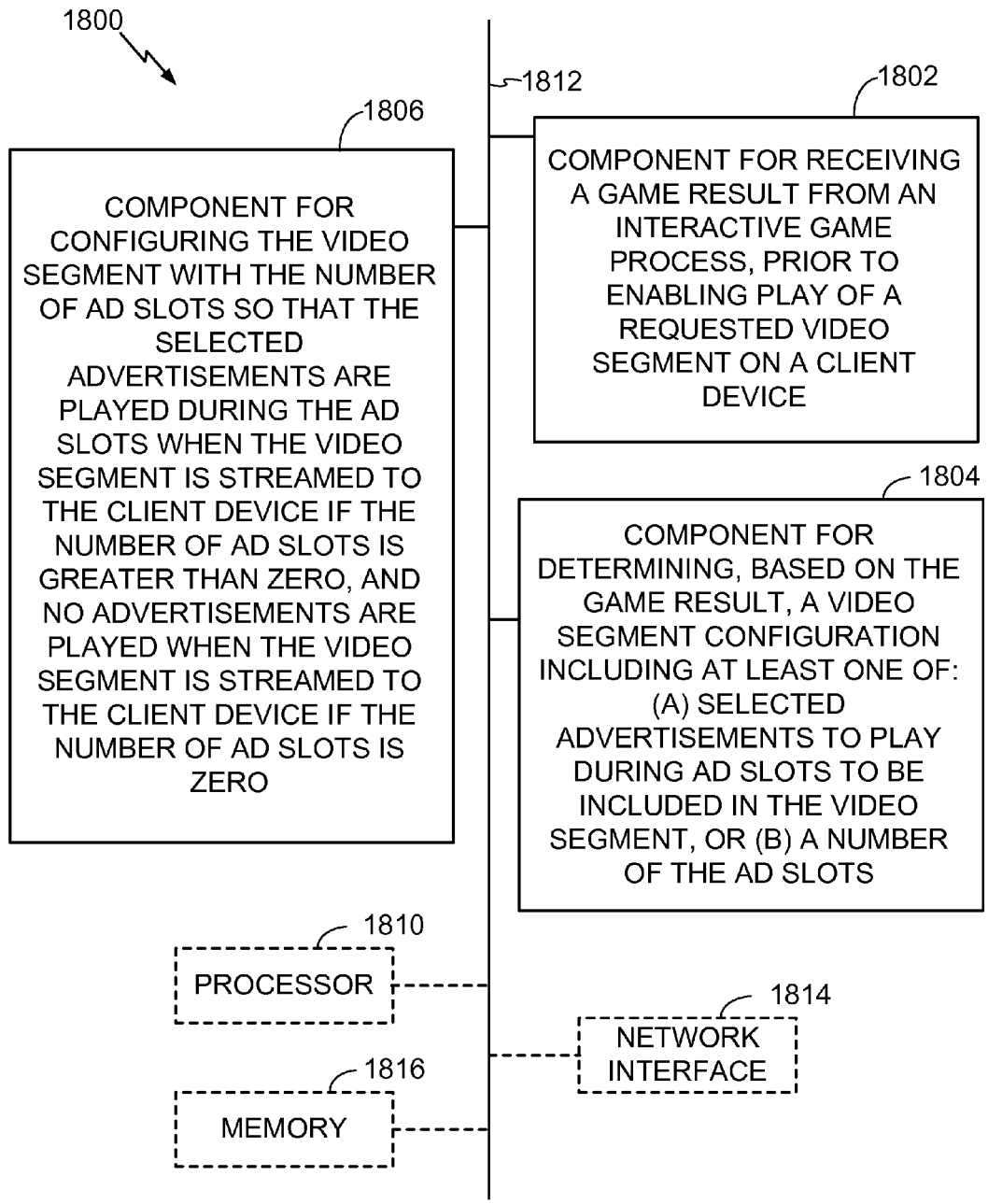
FIG. 18 is a diagram illustrating a network node configured for determining selection or configuration of advertising in a streaming video segment based on results of a computer game process.

With reference to FIG. 18, there is provided an exemplary apparatus 1800 that may be configured as computer server, client device, or combination of client and server, for determining selection or configuration of advertising in a streaming video segment based on results of a computer game process. The apparatus 1800 may include functional blocks that can represent functions implemented by a processor, software, or combination thereof (e.g., firmware).

As illustrated, in one embodiment, the apparatus 1800 may include an electrical component or means 1802 for receiving a game result from an interactive game process, prior to enabling play of a requested video segment on a client device. For example, the electrical component or means 1802 may include at least one control processor 1810 coupled to a memory component 1816. The control processor may operate an algorithm, which may be held as program instructions in the memory component. The algorithm may include, for example, receiving a request for a video segment from a client device, providing or waiting for a game result prior to providing the video segment to the client device, and receiving a game result from the client device or from a network-side game process.

The apparatus 1800 may further include an electrical component or module 1804 for determining, based on the game result, a video segment configuration including at least one of: (a) selected advertisements to play during ad slots to be included in the video segment or (b) a number of the ad slots. For example, the electrical component or means 1804 may include at least one control processor 1810 coupled to a memory component 1816. The control processor may operate an algorithm, which may be held as program instructions in the memory component. The algorithm may include, for example, receiving a list of ad segments selected as a result of the game process and determining identity and location of advertisements to be inserted in the video segment based on the list. The algorithm may include, for further example, determining a number or duration of ad slots based on one or more quasi-random numbers, as described above in connection with FIG. 7. The algorithm may include, for further example, determining a number or duration of ad slots, or an ad selection, based on one or more events or objectives achieved in a game of skill, as described above in connection with FIG. 9. The algorithm may include, for further example, determining a number or duration of ad slots, or an ad selection, based on a game score obtaining a threshold, as described above in connection with FIG. 10.

The apparatus 1800 may further include an electrical component or module 1806 for configuring the video segment with the number of ad slots so that the selected advertisements are played during the ad slots when the video segment is streamed to the client device if the number of ad slots is greater than zero, and no advertisements are played when the video segment is streamed to the client device if the number of ad slots is zero. For example, the electrical component or means 1806 may include at least one control processor 1810 coupled to a memory component 1816. The control processor may operate an algorithm, which may be held as program instructions in the memory component. The algorithm may include, for example, configuring a streaming video segment with a variable number of ad slots based on the game result, placing video advertisements identified by ad identifiers obtained by the game results in the ad slots, and streaming the video segment with inserted video advertisements, if any, to a media player component on the client device that requested the video segment and participated in play of the computer game.

The apparatus 1800 may include similar electrical components for performing any or all of the additional operations 1300, 1400, 1500, 1600 and 1700 described in connection with FIGS. 13-17, which for illustrative simplicity are not shown in FIG. 18.

In related aspects, the apparatus 1800 may optionally include a processor component 1810 having at least one processor. The processor 1810 may be in operative communication with the components 1802-1806 or similar components via a bus 1812 or similar communication coupling. The processor 1810 may effect initiation and scheduling of the processes or functions performed by electrical components 1802-1806.

In further related aspects, the apparatus 1800 may include a network interface component 1814 enabling communication between a client and a server. The apparatus 1800 may optionally include a component for storing information, such as, for example, a memory device/component 1816. The computer readable medium or the memory component 1816 may be operatively coupled to the other components of the apparatus 1800 via the bus 1812 or the like. The memory component 1816 may be adapted to store computer readable instructions and data for implementing the processes and behavior of the components 1802-1806, and subcomponents thereof, or the processor 1810, or the methods disclosed herein. The memory component 1816 may retain instructions for executing functions associated with the components 1802-1806. While shown as being external to the memory 1816, it is to be understood that the components 1802-1806 can exist within the memory 1816.

Client-Side Operations and Apparatus

Figure 19:
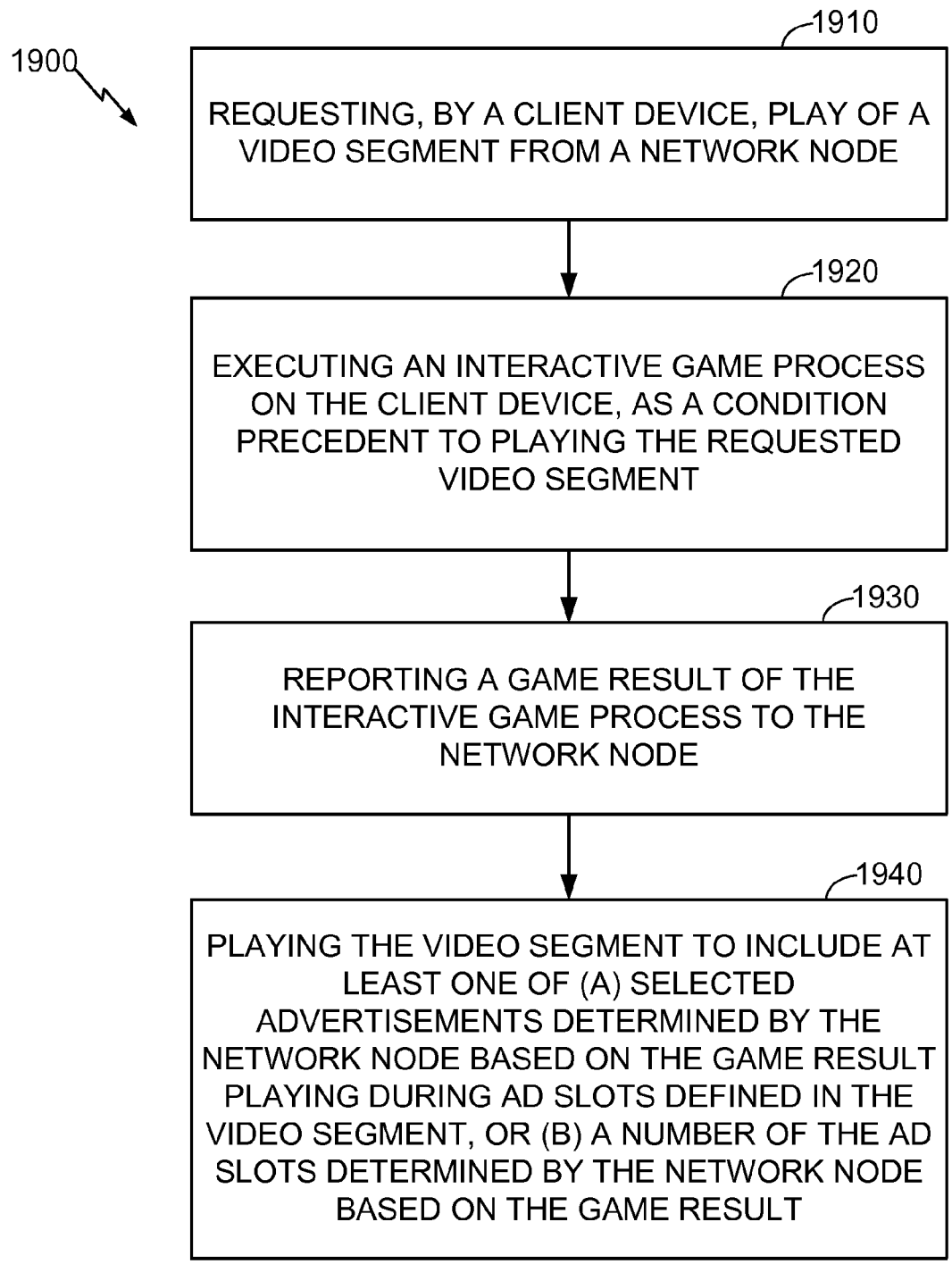
FIGS. 19-23 are diagrams illustrating operations that may be performed by a client device in connection with selection or configuration of advertising in a streaming video segment based on results of a computer game process.

A method 1900 shown in FIG. 19 may be performed by a client device for selection or configuration of advertising in a streaming video segment based on results of a computer game process. The method 1900 may include, at 1910, requesting, by a client device, play of a video segment from a network node. For example, the client device may receive user input selecting a link on a displayed page, and send a request for the video segment to a designated network address based on the link selection.

The method 1900 may further include, at 1920, executing an interactive game process on the client device, as a condition precedent to playing the requested video segment. For example, the client device may operate as a thin client receiving user input to a game process operating on a network node, forwarding the user input or a signal based on the user input to the game process, and receiving rendered video data from the game process. In an alternative, the client device may operate as a smart client operating the game process, receiving the user input and generating rendered video for depicting progress of the game. The game process may include any one of the various types disclosed herein, for example, in connection with FIGS. 3, 7, 9 or 10. The delivery of the requested video segment may be conditioned on completing the game process, such that the client device does not receive the streaming video segment until the game process is completed and results reported to a node configuring the video segment. However, this condition may be made subject to user consent; users may be motivated to provide such consent by the entertainment value provided by the game process, and/or the opportunity to influence or control the selection and/or amount of inserted video advertising presented during streaming video segment by playing the game.

The method may further include, at 1930, reporting a game result of the interactive game process to the network node, for example if the client is a smart client operating the game process. In an alternative, the client may receive a game result from a network node operating the game process, and display the game result on a display device at the client.

The method may further include, at 1940, playing the video segment to include at least one of (a) selected advertisements determined by the network node based on the game result playing during ad slots defined in the video segment, or (b) a number of the ad slots determined by the network node based on the game result. The client device may operate as a thin client playing streaming video content with inserted video advertising configured at a network node in response to the game result. Nonetheless, output at the client may thereby be controlled in part based on results of the game process. In turn, such results may depend on chance, on skill of a person operating the client device to participate in the game process, or a combination of the foregoing. In addition, state data representing potential output of video streaming at the client may be transformed as a result of a game process involving the client.

It should be appreciated that the operations described in connection the method 1900 may involve operations of a computer server to the extent that the client device is operating as a dumb terminal or portal to a process occurring at a different computer. Various distributions of these operations may be implemented between a client device and host device, without departing from the scope of the method 1900.

With reference to FIGS. 20-23, several additional operations 2000, 2100, 2200 and 2300 are depicted for selection or configuration of advertising in a streaming video segment based on results of a computer game process, which may be performed by a client device, alone or in combination with a server. One or more of operations 2000, 2100, 2200 and 2300 may optionally be performed as part of the method 1900. The elements 2000, 2100, 2200 or 2300 may be performed in any operative order, or may be encompassed by a development algorithm without requiring a particular chronological order of performance Operations can be independently performed and are not mutually exclusive. Therefore any one of such operations may be performed regardless of whether another downstream or upstream operation is performed. For example, if the method 1900 includes at least one of the operations 2000, 2100, 2200 or 2300, then the method 1900 may terminate after the at least one operation, without necessarily having to include any subsequent downstream operation(s) that may be illustrated.

Figure 20:
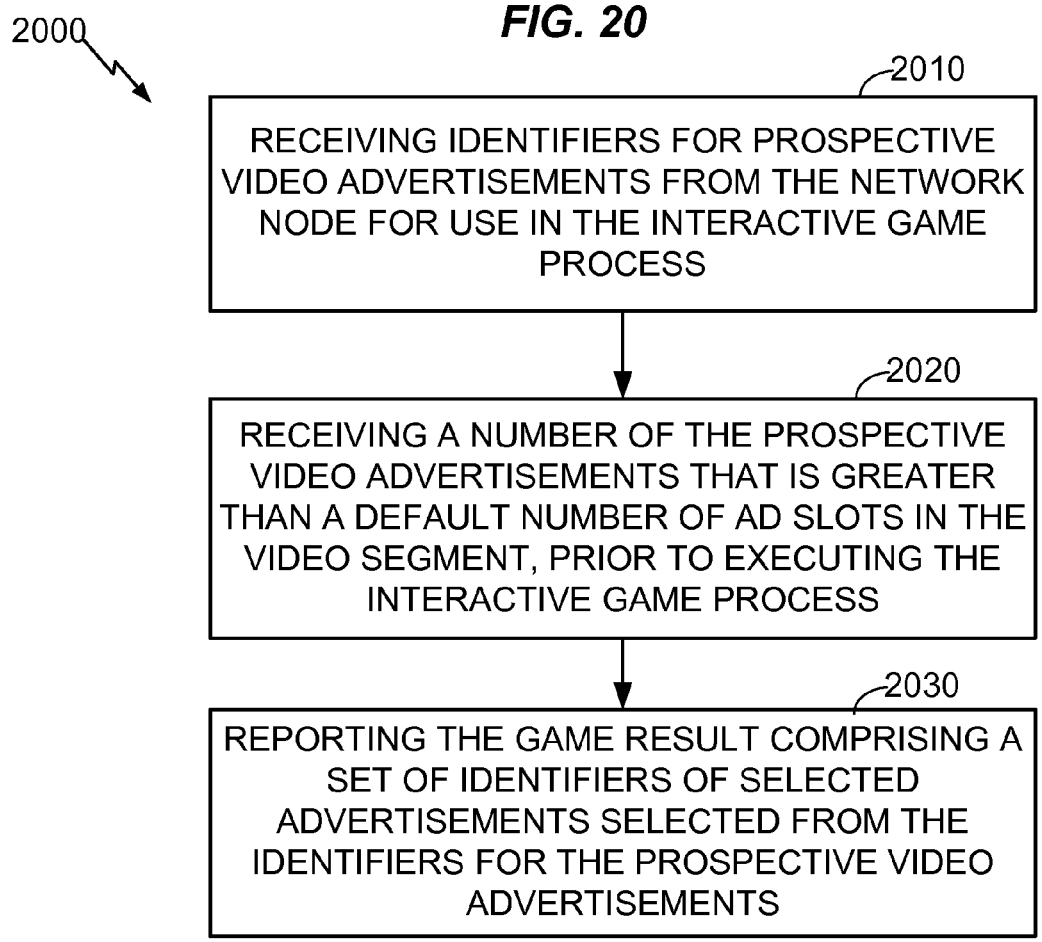

In an aspect, with reference to FIG. 20, the method 1900 may further include, at 2010, receiving identifiers for prospective video advertisements from the network node for use in the interactive game process. For example, the client may receive a list of identifiers associated with icons, logos, or other objects appearing in a user interface of a game process. In an alternative, if the game process is performed at a network node, the identifiers may be retained in a network location without being provided to the client, even if video output showing the objects represented in the game process is provided to the client device. In such case, the operation 2010 of receiving the identifiers may be performed by the game process residing at a network location.

The method 1900 may further include, at 2020, receiving a number of the prospective video advertisements that is greater than a default number of ad slots in the video segment, prior to executing the interactive game process. Again, the operation 2020 may be performed by a computing entity performing the game process, whether the client device, network node, or some other entity in communication with the client device. This operation may be performed when a smaller subset of advertisements will be determined based on the game result, selected from a larger initial set of prospective ad identifiers.

The method 1900 may further include, at 2030, reporting the game result comprising a set of identifiers of selected advertisements selected from the identifiers for the prospective video advertisements. The operation 2030 may be performed by a computing entity performing the game process, whether the client device, network node, or some other entity in communication with the client device. It may be desirable to display the game result on a user interface for the game process at the client device. Therefore, if the client is not performing the game process, the entity performing the game process may perform the reporting 2030 directed to the client node and/or to another process that is configuring the video segment based on the game results. Conversely, if the client is performing the game process, the client may perform the reporting 2030 to a module designated for configuring the video segment based on the game results.

Figure 21:
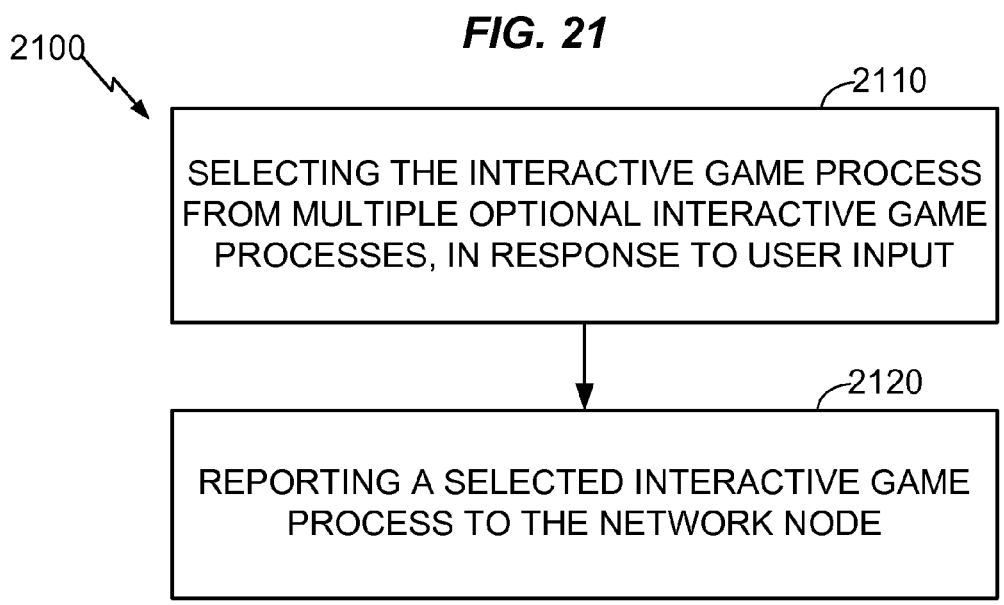

In another aspect, with reference to FIG. 21, the method 1900 may further include, at 2110, selecting the interactive game process from multiple optional interactive game processes, in response to user input. This operation 2110 may be performed by the client device or on some network node, automatically or in response to user selection of a game process identifier from a menu of identifiers or the like. The user input may be received from a user input component of the client device, in response to physical input of same kind (e.g., touching, typing, speaking, gesturing, etc.). The method 1900 may further include, at 2120, reporting a selected interactive game process to the network node, for example if the selecting 2110 is performed by the client device.

Figure 22:
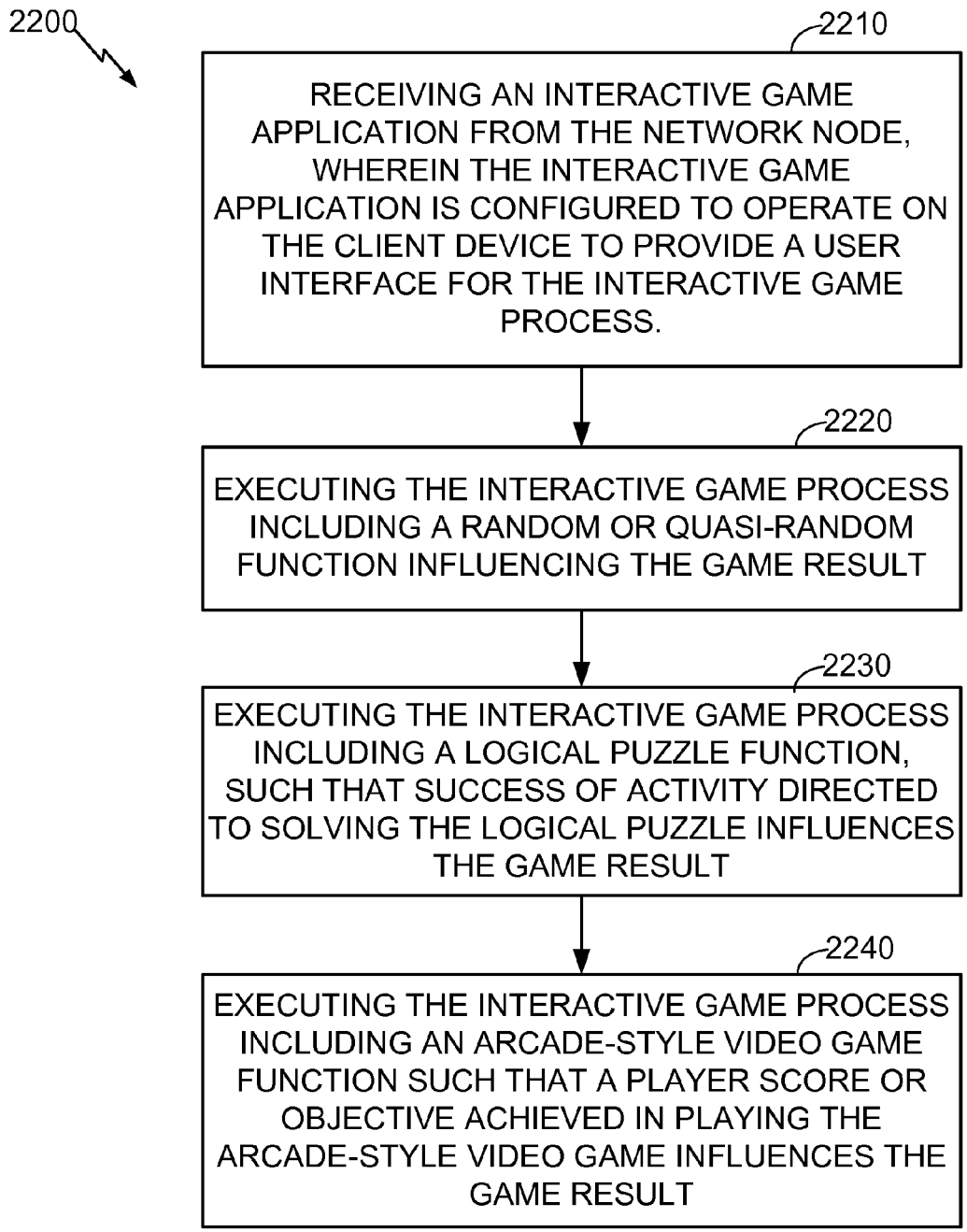

In another aspect, with reference to FIG. 22, the method 1900 may further include, at 2210, receiving an interactive game application from the network node, wherein the interactive game application is configured to operate on the client device to provide a user interface for the interactive game process. For example, the client device may receive a distributable application including the game process encoded for executing in the environment of the client device. In an alternative, the client may receive a user interface for providing user input to a network game process and receiving rendered video from the game process for display at the client, for example using a media player component. In another alternative, for example for a game of chance that does not require user input, the client device may receive only rendered output for displaying game process activity and results.

The game process executing on the client or network node may be, or may include, one of the types of game processes as described herein. For example, the method 1900 may further include, at 2220, executing the interactive game process including a random or quasi-random function influencing the game result, as described in more detail in connection with FIG. 7, and elsewhere herein above. For further example, the method 1900 may include, at 2230, executing the interactive game process including a logical puzzle function, such that success of activity directed to solving the logical puzzle influences the game result. For example, a game process may include requiring solution to a puzzle in a certain amount of time to obtain a score or other game result causing reduction in a number of ad slots to be included in the streaming video segment. For further example, the method 1900 may include, at 2240, executing the interactive game process including an arcade-style video game function such that a player score or objective achieved in playing the arcade-style video game influences the game result. Examples of such processes are described above in connection with FIGS. 8-10.

Figure 23:
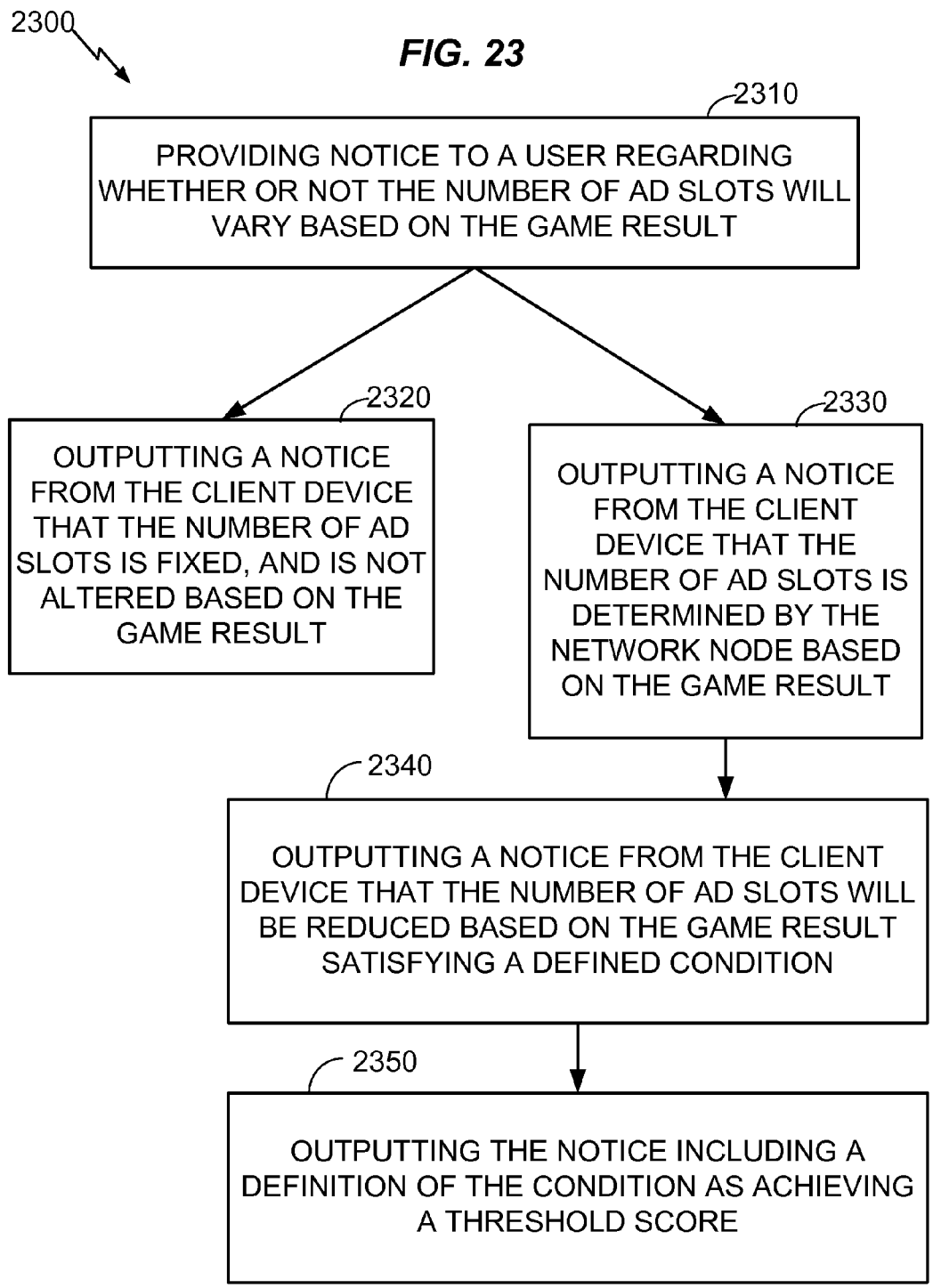

In another aspect, with reference to FIG. 23, the method 1900 may further include, at 2310, providing notice to a user regarding whether or not the number of ad slots will vary based on the game result. Controlling the number of ad slots may generally be performed by a network node that configures streaming video for streaming to client devices, but whether or not such control is allowed for a particular streaming session may be communicated to a client device, which may display a corresponding notice to the user. In one alternative, the method 1900 may further include, at 2320, outputting a notice from the client device that the number of ad slots is fixed, and is not altered based on the game result. In an alternative, this may be regarded as a default condition for which notice is not provided. In another alternative, the method 1900 may further include, at 2330, outputting a notice from the client device that the number of ad slots is determined by the network node based on the game result. This may alert the user to a reward or benefit to be gained, from the user's perspective, for participating in a pre-play game process. In such alternatives, the method 1900 may include, at 2340, outputting a notice from the client device that the number of ad slots will be reduced based on the game result satisfying a defined condition. For example, the method 1900 may include, at 2350, outputting the notice including a definition of the condition as achieving a threshold score.

Figure 24:
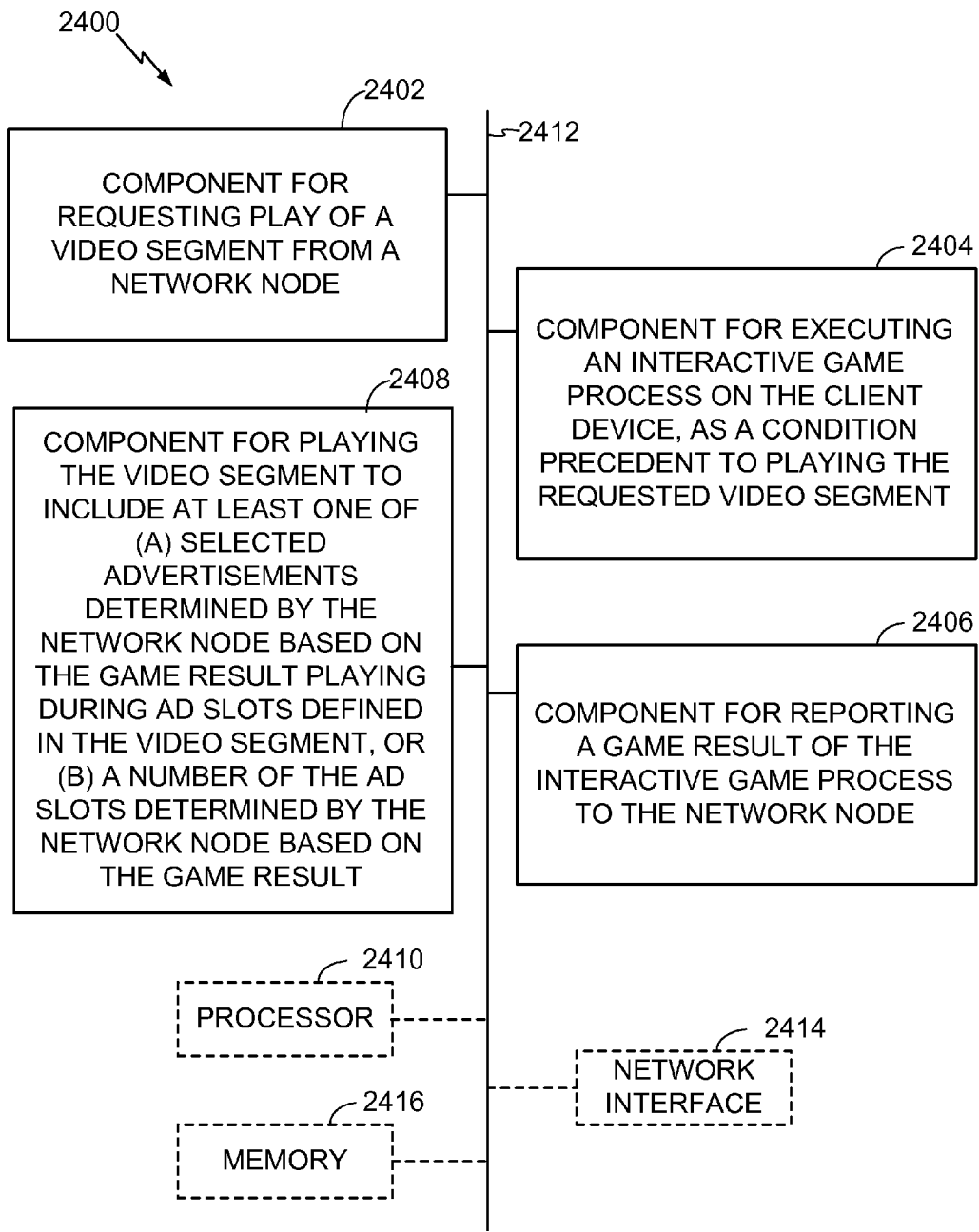
FIG. 24 is a diagram illustrating a client device configured for selection or configuration of advertising in a streaming video segment based on results of a computer game process.

With reference to FIG. 24, there is provided an exemplary apparatus 2400 that may be configured as client device, computer server or combination of client and server, for selection or configuration of advertising in a streaming video segment based on results of a computer game process. The apparatus 2400 may include functional blocks that can represent functions implemented by a processor, software, or combination thereof (e.g., firmware).

As illustrated, in one embodiment, the apparatus 2400 may include an electrical component or means 2402 for requesting play of a video segment from a network node. For example, the electrical component or means 2402 may include at least one control processor 2410 coupled to a memory component 2416. The control processor may operate an algorithm, which may be held as program instructions in the memory component. The algorithm may include, for example, displaying a content page including links to one or more available video segments, detecting user input indicating selection of one of the links, and transmitting a request to an address indicated by the selected link, in response to detecting the selection input.

The apparatus 2400 may further include an electrical component or module 2404 for executing an interactive game process on the client device (or in the alternative, at a network node), as a condition precedent to playing the requested video segment. For example, the electrical component or means 2404 may include at least one control processor 2410 coupled to a memory component 2416. The control processor may operate an algorithm, which may be held as program instructions in the memory component. The algorithm may include, for example, receiving a signal from the network indicating that a game process is available, in response to the request to play a video segment, detecting user input indicating selection or consent to playing the game process, and initiating execution of a user interface for the game process, alone or in cooperation with a network node.

The apparatus 2400 may further include an electrical component or module 2406 for reporting a game result of the interactive game process to the network node. For example, the electrical component or means 2406 may include at least one control processor 2410 coupled to a memory component 2416. The control processor may operate an algorithm, which may be held as program instructions in the memory component. The algorithm may include, for example, determining a game result, and transmitting the game result to a designated network node.

The apparatus 2400 may further include an electrical component or module 2408 for playing the video segment to include at least one of (a) selected advertisements determined by the network node based on the game result playing during ad slots defined in the video segment, or (b) a number of the ad slots determined by the network node based on the game result. For example, the electrical component or means 2408 may include at least one control processor 2410 coupled to a memory component 2416. The control processor may operate an algorithm, which may be held as program instructions in the memory component. The algorithm may include, for example, operating a media player component, receiving a streaming video segment including a number and configuration of ad slots, and/or selection of advertisements, determined by a network component in response to the game results, and playing the streaming video segment using the media player component.

The apparatus 2400 may include similar electrical components for performing any or all of the additional operations 2000, 2100, 2200 or 2300 described in connection with FIGS. 20-23, which for illustrative simplicity are not shown in FIG. 24.

In related aspects, the apparatus 2400 may optionally include a processor component 2410 having at least one processor, in the case of the apparatus 2400 configured to include a processor for a client device. The processor 2410 may be in operative communication with the components 2402-2408 or similar components via a bus 2412 or similar communication coupling. The processor 2410 may effect initiation and scheduling of the processes or functions performed by electrical components 2402-2408.

In further related aspects, the apparatus 2400 may include a network interface component 2414 enabling communication between a client and a server. The apparatus 2400 may include a component for storing information, such as, for example, a memory device/component 2416. The computer readable medium or the memory component 2416 may be operatively coupled to the other components of the apparatus 2400 via the bus 2412 or the like. The memory component 2416 may be adapted to store computer readable instructions and data for implementing the processes and behavior of the components 2402-2408, and subcomponents thereof, or the processor 2410, or the methods disclosed herein. The memory component 2416 may retain instructions for executing functions associated with the components 2402-2408. While shown as being external to the memory 2416, it is to be understood that the components 2402-2408 can exist within the memory 2416.

It is understood that the specific order or hierarchy of steps in the processes disclosed are merely examples. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for configuring advertisements in a video segment based on a game result, by at least one computer, the method comprising:
   receiving a game result from an interactive game process prior to enabling play of a requested video segment on a client device;
   determining, based on the game result satisfying a defined condition, a video segment configuration including at least: (a) selected advertisements to play during ad slots to be included in the video segment, and (b) a number of the ad slots;
   configuring the video segment with the number of ad slots so that the selected advertisements are played during the ad slots when the video segment is streamed to the client device if the number of ad slots is greater than zero, and no advertisements are played when the video segment is streamed to the client device if the number of ad slots is zero; and
   transmitting an interactive game application to the client device, wherein the interactive game application is configured to operate on the client device to provide a user interface for the interactive game process.

2. The method of claim 1, further comprising transmitting identifiers for prospective video advertisements to the client device for use in the interactive game process.

3. The method of claim 2, further comprising selecting a number of the prospective video advertisements that is greater than a default number of ad slots in the video segment, prior to transmitting the identifiers.

4. The method of claim 3, further comprising receiving the game result comprising a set of identifiers of selected advertisements selected from the identifiers for the prospective video advertisements.

5. The method of claim 1, further comprising including a random or quasi-random function in the interactive game application influencing the game result.

6. The method of claim 1, further comprising including a logical puzzle function in the interactive game application, such that success of activity directed to solving the logical puzzle influences the game result.

7. The method of claim 1, further comprising including an arcade-style video game function in the interactive game application, such that a player score or objective achieved in playing the arcade-style video game influences the game result.

8. The method of claim 1, further comprising inferring a demographic characteristic from the game result, and determining the selected advertisements based at least in part on the demographic characteristic.

9. The method of claim 1, further comprising receiving a selection from the client device of the interactive game process selected from multiple optional interactive game processes.

10. The method of claim 9, further comprising inferring a demographic characteristic from the selection, and determining the selected advertisements based at least in part on the demographic characteristic.

11. The method of claim 1, wherein the number of ad slots is fixed prior to determining the selected advertisements based on the game result, and is not altered based on the game result.

12. The method of claim 1, further comprising defining the number of ad slots based on the game result.

13. The method of claim 12, further comprising reducing the number of ad slots, based on the game result satisfying a defined condition.

14. The method of claim 13, further comprising defining the condition based on the game result achieving a threshold score.

15. An apparatus, comprising:
   at least one processor configured for: receiving a game result from an interactive game process, prior to enabling play of a requested video segment on a client device, determining, based on the game result satisfying a defined condition, a video segment configuration including at least: (a) selected advertisements to play during ad slots to be included in the video segment, and (b) a number of the ad slots, and configuring the video segment with the number of ad slots so that the selected advertisements are played during the ad slots when the video segment is streamed to the client device if the number of ad slots is greater than zero, and no advertisements are played when the video segment is streamed to the client device if the number of ad slots is zero; a memory coupled to the at least one processor for storing data; and transmitting an interactive game application to the client device, wherein the interactive game application is configured to operate on the client device to provide a user interface for the interactive game process.

16. The apparatus of claim 15, wherein the processor is further configured for transmitting identifiers for prospective video advertisements to the client device for use in the interactive game process.

17. The apparatus of claim 15, wherein the processor is further configured for selecting a number of the prospective video advertisements that is greater than a default number of ad slots in the video segment, prior to transmitting the identifiers.

18. The apparatus of claim 17, wherein the processor is further configured for receiving the game result comprising a set of identifiers of selected advertisements selected from the identifiers for the prospective video advertisements.

19. The apparatus of claim 15, wherein the processor is further configured for including a random or quasi-random function in the interactive game application influencing the game result.

20. The apparatus of claim 15, wherein the processor is further configured for including a logical puzzle function in the interactive game application, such that success of activity directed to solving the logical puzzle influences the game result.

21. The apparatus of claim 15, wherein the processor is further configured for including an arcade-style video game function in the interactive game application, such that a player score or objective achieved in playing the arcade-style video game influences the game result.

22. The apparatus of claim 15, wherein the processor is further configured for inferring a demographic characteristic from the game result, and determining the selected advertisements based at least in part on the demographic characteristic.

23. The apparatus of claim 15, wherein the processor is further configured for receiving a selection from the client device of the interactive game process selected from multiple optional interactive game processes.

24. The apparatus of claim 15, wherein the processor is further configured for defining the number of ad slots based on the game result.

25. The apparatus of claim 24, wherein the processor is further configured for reducing the number of ad slots, based on the game result satisfying a defined condition.

26. A computer program product, comprising:
a non-transitory computer-readable medium comprising code for receiving a game result from an interactive game process, prior to enabling play of a requested video segment, determining, based on the game result, a video segment configuration including at least one of (a) selected advertisements to play during ad slots to be included in the video segment, or (b) a number of the ad slots, and configuring the video segment with the number of ad slots so that the selected advertisements are played during the ad slots when the video segment is streamed to the client device if the number of ad slots is greater than zero, and no advertisements are played when the video segment is streamed to the client device if the number of ad slots is zero; and
transmitting an interactive game application to the client device, wherein the interactive game application is configured to operate on the client device to provide a user interface for the interactive game process.

27. A method for providing input for configuring advertisements in a video segment based on a game result, by at least one client device, the method comprising:
requesting, by a client device, play of a video segment from a network node;
executing an interactive game process on the client device, as a condition precedent to playing the requested video segment;
reporting a game result of the interactive game process to the network node; and
playing the video segment to include at least one of (a) selected advertisements determined by the network node based on the game result playing during ad slots defined in the video segment, or (b) a number of the ad slots determined by the network node based on the game result.

28. The method of claim 27, further comprising receiving identifiers for prospective video advertisements from the network node for use in the interactive game process.

29. The method of claim 28, further comprising receiving a number of the prospective video advertisements that is greater than a default number of ad slots in the video segment, prior to executing the interactive game process.

30. The method of claim 29, further comprising reporting the game result comprising a set of identifiers of selected advertisements selected from the identifiers for the prospective video advertisements.

31. The method of claim 27, further comprising executing the interactive game process including a random or quasi-random function influencing the game result.

32. The method of claim 27, further comprising executing the interactive game process including a logical puzzle function, such that success of activity directed to solving the logical puzzle influences the game result.

33. The method of claim 27, further comprising executing the interactive game process including an arcade-style video game function such that a player score or objective achieved in playing the arcade-style video game influences the game result.

34. The method of claim 27, further comprising selecting the interactive game process from multiple optional interactive game processes, in response to user input.

35. The method of claim 27, further comprising outputting a notice from the client device that the number of ad slots is fixed, and is not altered based on the game result.

36. The method of claim 27, further comprising outputting a notice from the client device that the number of ad slots is determined by the network node based on the game result.

37. The method of claim 36, further comprising outputting a notice from the client device that the number of ad slots will be reduced based on the game result satisfying a defined condition.

38. The method of claim 37, further comprising outputting the notice including a definition of the condition as achieving a threshold score.

39. An apparatus, comprising:
at least one processor configured for: requesting play of a video segment from a network node, executing an interactive game process on the client device, as a condition precedent to playing the requested video segment, reporting a game result of the interactive game process to the network node, playing the video segment to include based on the defined game result condition: (a) selected advertisements determined by the network node based on the game result playing during ad slots defined in the video segment, and (b) a number of the ad slots determined by the network node based on the game result;
a memory coupled to the at least one processor for storing data; and transmitting an interactive game application to the client device, wherein the interactive game application is configured to operate on the client device to provide a user interface for the interactive game process.

40. The apparatus of claim 39, wherein the processor is further configured for receiving identifiers for prospective video advertisements from the network node for use in the interactive game process.

41. The apparatus of claim 40, wherein the processor is further configured for receiving a number of the prospective video advertisements that is greater than a default number of ad slots in the video segment, prior to executing the interactive game process.

42. The apparatus of claim 41, wherein the processor is further configured for reporting the game result comprising a set of identifiers of selected advertisements selected from the identifiers for the prospective video advertisements.

43. The apparatus of claim 39, wherein the processor is further configured for executing the interactive game process including a random or quasi-random function influencing the game result.

44. The apparatus of claim 39, wherein the processor is further configured for executing the interactive game process including a logical puzzle function, such that success of activity directed to solving the logical puzzle influences the game result.

45. The apparatus of claim 39, wherein the processor is further configured for executing the interactive game process including an arcade-style video game function such that a player score or objective achieved in playing the arcade-style video game influences the game result.

46. The apparatus of claim 39, wherein the processor is further configured for selecting the interactive game process from multiple optional interactive game processes, in response to user input.

47. The apparatus of claim 39, wherein the processor is further configured for outputting a notice from the client device that the number of ad slots is fixed, and is not altered based on the game result.

48. The apparatus of claim 39, wherein the processor is further configured for outputting a notice from the client device that the number of ad slots is determined by the network node based on the game result.

49. The apparatus of claim 48, wherein the processor is further configured for outputting a notice from the client device that the number of ad slots will be reduced based on the game result satisfying a defined condition.

50. A computer program product, comprising:
a non-transitory computer-readable medium comprising code for requesting play of a video segment from a network node, executing an interactive game process on the client device, as a condition precedent to playing the requested video segment, reporting a game result of the interactive game process to the network node, and playing the video segment to include based on the defined game result condition, at least (a) selected advertisements determined by the network
node based on the game result playing during ad slots defined in the video segment, and (b) a number of the ad slots determined by the network node based on the game result;
a memory coupled to the at least one processor for storing data; and transmitting an interactive game application to the client device, wherein the interactive game application is configured to operate on the client device to provide a user interface for the interactive game process.

* * * * *

UNITED STATES PATENT AND TRADEMARK OFFICE
CERTIFICATE OF CORRECTION

PATENT NO.        : 8,409,000 B1
APPLICATION NO.   : 13/417151
DATED             : April 2, 2013
INVENTOR(S)       : Jean-Paul Colaco et al.

Page 1 of 1

It is certified that error appears in the above-identified patent and that said Letters Patent is hereby corrected as shown below:

In the Claims

In column 26, lines 38-58, delete claim 15 and insert:

--15. An apparatus, comprising:

at least one processor configured for: receiving a game result from an interactive game process, prior to enabling play of a requested video segment on a client device, determining, based on the game result satisfying a defined condition, a video segment configuration including at least: (a) selected advertisements to play during ad slots to be included in the video segment, and (b) a number of the ad slots, configuring the video segment with the number of ad slots so that the selected advertisements are played during the ad slots when the video segment is streamed to the client device if the number of ad slots is greater than zero, and no advertisements are played when the video segment is streamed to the client device if the number of ad slots is zero, and transmitting an interactive game application to the client device, wherein the interactive game application is configured to operate on the client device to provide a user interface for the interactive game process; and
       a memory coupled to the at least one processor for storing data.--

Signed and Sealed this
Twenty-fourth Day of September, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,409,000 B1 | Page 1 of 1 |
| APPLICATION NO. | : 13/417151 | |
| DATED | : April 2, 2013 | |
| INVENTOR(S) | : Jean-Paul Colaco et al. | |

It is certified that error appears in the above-identified patent and that said Letters Patent is hereby corrected as shown below:

On the title page, item (73) Assignee:, insert --,-- after Hulu.

Signed and Sealed this
Seventeenth Day of December, 2013

Margaret A. Focarino
*Commissioner for Patents of the United States Patent and Trademark Office*